(12) United States Patent
Ivanov et al.

(10) Patent No.: US 11,965,974 B2
(45) Date of Patent: Apr. 23, 2024

(54) METHODS AND SYSTEMS FOR USING A VEHICLE LOCATION TO GEO-REFERENCE RADIO DATA COLLECTED DURING A TIME OF COMMUTE

(71) Applicant: HERE GLOBAL B.V., Eindhoven (NL)

(72) Inventors: Pavel Ivanov, Tampere (FI); Henri Jaakko Julius Nurminen, Tampere (FI); Marko Luomi, Lempäälä (FI); Lauri Aarne Johannes Wirola, Tampere (FI)

(73) Assignee: HERE GLOBAL B.V., Eindhoven (NL)

( * ) Notice: Subject to any disclaimer, the term of this patent is extended or adjusted under 35 U.S.C. 154(b) by 448 days.

(21) Appl. No.: 17/478,356

(22) Filed: Sep. 17, 2021

(65) Prior Publication Data

US 2023/0093158 A1  Mar. 23, 2023

(51) Int. Cl.
*G01S 5/02* (2010.01)
*H04L 67/52* (2022.01)
(Continued)

(52) U.S. Cl.
CPC .......... *G01S 5/02526* (2020.05); *H04L 67/52* (2022.05); *H04W 4/021* (2013.01); *H04W 4/024* (2018.02); *H04W 52/0235* (2013.01)

(58) Field of Classification Search
CPC ... G01S 5/02526; H04W 4/021; H04W 4/024; H04W 4/029; H04L 67/52
See application file for complete search history.

(56) References Cited

U.S. PATENT DOCUMENTS 6,947,835 B2  9/2005  Kaplan et al.
7,818,017 B2  10/2010  Alizadeh-Shahdiz et al.
(Continued)

FOREIGN PATENT DOCUMENTS

CN  106530716 A  3/2017
EP  3709045 A1 *  9/2020  ............ H04W 4/025

OTHER PUBLICATIONS

Dennis, et al., "Crowdsourcing Transportation Systems Data," Michigan Department of Transportation and The Center for Automotive Research, Feb. 2015 (66 pps.).
(Continued)

*Primary Examiner* — Bernarr E Gregory
*Assistant Examiner* — Fred H Mull
(74) *Attorney, Agent, or Firm* — Jeffrey R Moisan; HERE GLOBAL B.V.

(57) ABSTRACT

Disclosed is an approach to improve data collection for a radio-based positioning system. The disclosed approach may involve processor(s) (e.g., of positioning server(s) and/or of a mobile device) obtaining radio data associated with the mobile device, where the radio data is collected while the mobile device is located within a particular vehicle during a time of commute. The processor(s) may determine a particular location of the particular vehicle representing where the particular vehicle is or was located during the time of commute. And the processor(s) may then use the particular location of the particular vehicle to geo-reference the radio data collected while the mobile device is located within the particular vehicle during the time of commute.

5 Claims, 9 Drawing Sheets

(51) Int. Cl.
*H04W 4/021* (2018.01)
*H04W 4/024* (2018.01)
*H04W 52/02* (2009.01)

(56) References Cited

U.S. PATENT DOCUMENTS

| | | |
|---|---|---|
| 8,880,323 B2 | 11/2014 | Jain et al. |
| 9,402,154 B2 | 7/2016 | Houri |
| 9,689,698 B2 | 6/2017 | Wesselius et al. |
| 10,515,549 B1 | 12/2019 | Luomi et al. |
| 10,878,693 B2 | 12/2020 | Ma et al. |
| 11,218,836 B1* | 1/2022 | Ilieva .................... H04W 4/021 |
| 2020/0137514 A1* | 4/2020 | Wirola .................. H04W 4/024 |
| 2021/0099307 A1 | 4/2021 | Rolf et al. |

OTHER PUBLICATIONS

Mukheja, et al., "Smartphone-Based Crowdsourcing for Position Estimation of Public Transport Vehicles," Department of Civil Engineering, vol. 11, Issue 9, Nov. 2017 (pp. 588-595).

* cited by examiner

METHODS AND SYSTEMS FOR USING A VEHICLE LOCATION TO GEO-REFERENCE RADIO DATA COLLECTED DURING A TIME OF COMMUTE

FIELD OF THE DISCLOSURE

Embodiments of the present disclosure relate to the field of positioning technologies, and more specifically to methods and systems for improving collection of positioning-related data.

BACKGROUND

In practice, positioning technologies could provide for numerous benefits, such as by enabling tracking of assets and/or navigation through indoor and outdoor environments, among other possibilities. Such benefits may be realized through the development of positioning system(s) and associated service(s) that may collectively provide a solution to various positioning-related use cases. Generally speaking, a positioning solution can be commercially successful if it is globally scalable, has low deployment and maintenance costs, and offers an acceptable end-user experience. To facilitate this, the solution could be based on existing infrastructure deployed in buildings and/or outdoors (e.g., Wi-Fi, Bluetooth, Base Station(s) etc.) as well as on existing capabilities in consumer devices, such as on radio technologies that are already supported in numerous consumer devices on the market, among other options.

One approach for such radio-based positioning could involve crowdsourced collection of radio "fingerprint(s)" from mobile devices, which may then be used for generating or updating radio map(s). A given fingerprint may include radio data representing measurements of radio signals respectively observed by the mobile devices, which may include received signal strength value(s), round-trip time value(s) and/or respective identifiers of radio node(s) emitting those signal(s) etc. Additionally, a given fingerprint may include a position estimate determined or obtained by the mobile device, which may be used for geo-referencing the radio data in the fingerprint so as to indicate a location where the radio data was collected. Such a position estimate may be, for example, based on Global Navigation Satellite System (GNSS) data, sensor data, and/or may be manually inputted via a user interface, among other options.

Once a radio map is generated or updated based on collected fingerprint(s), the radio map may effectively model a radio environment in an indoor and/or outdoor area. In practice, this could enable an entity (e.g., a server or a mobile device) to determine characteristics of radio signals that are expected to be observable respectively at different locations in the area. Given this, the entity could compare further (e.g., radio) measurements from a device to the radio map, to estimate a position of that device in the area.

Although radio-based positioning provides for numerous benefits, the above-described data collection process could lead to extensive use of resources by any given mobile device that contributes crowdsourced data. For example, the mobile device could use a GNSS component to enable geo-referencing of radio data, which could lead to extensive power consumption by the mobile device over time. In many cases, in order to limit or otherwise reduce such extensive resource consumption, the mobile device could be configured to contribute crowdsourced data only at certain time(s), such as e.g., at time(s) when the mobile device actively uses both location (e.g., GNSS) and radio resources (e.g., when a user of the mobile device is using a navigation application on the mobile device.) As a result of such limitations, mobile device(s) may contribute less data over time, which may in turn lead to radio map(s) that are less accurate, provide for insufficient coverage, and/or are not up to date, among various other possible issues.

Therefore, a technical improvement is desired to help overcome the above-described deficiencies, to advantageously help improve performance of radio-based positioning systems.

SUMMARY

Disclosed herein is an improved approach for geo-referencing radio data collected by mobile device(s) during the above-described crowdsourcing process. This approach has been developed through a unique realization that user(s) may commute on a variety of vehicle(s), and that the user(s)' mobile device(s) could determine or otherwise obtain respective location(s) of at least some of those vehicle(s) with significantly reduced power consumption (e.g., compared to power consumption of a GNSS component). The vehicle(s) at issue may include public transport vehicle(s), taxi(s), and/or ride-share vehicle(s), among others. As such, the disclosed approach may involve using a vehicle location to geo-reference radio data collected during a time of commute.

More specifically, a user's mobile device could collect radio data during the user's commute on a vehicle. For instance, the mobile device could observe signal(s) emitted by radio node(s) in the environment of the vehicle. The node(s) could be positioned outdoors and/or indoors and may include cellular network node(s) (e.g., a base station serving as wireless communication station installed at fixed location) and/or Wi-Fi access point(s), among other possibilities.

During and/or after collection of the radio data, an entity (e.g., the mobile device or a positioning server) could determine or obtain location(s) of the vehicle associated with the user's time of commute. For instance, the user's time of commute could span a certain time period, and the entity could obtain information indicating where the vehicle is or was respectively located during time(s) within that time period. The entity could do so in real-time (e.g., substantially during the radio data collection) and/or after the time of commute. In either case, the entity could obtain vehicle location(s) from a transport service application running on the mobile device, from a database associated with the transport service, and/or directly from a component of the vehicle.

Subsequently, the entity could match the commute-time vehicle location(s) with the radio data collected during the time of commute, so that the vehicle location(s) can be used to geo-reference the collected radio data. For instance, each vehicle location may be respectively timestamped to indicate whether the vehicle was located at a given time. Similarly, each instance of collected radio data may be respectively timestamped to indicate a time associated with collection of that respective instance of radio data. As a result, the entity could match the commute-time vehicle location(s) with the radio data collected based on the timestamps at issue.

Given this, the combination of the commute-time vehicle location(s) and the collected radio data can be used in a radio-based positioning system. For example, the mobile device could generate a fingerprint including (i) an instance of radio data associated with a given time as well as (ii) an indication of a location, which may be the location of the vehicle during that given time. The mobile device could then provide the fingerprint to a positioning server, and the positioning server may then use the fingerprint as basis for generating or updating a radio map. Additionally or alternatively, the positioning server could obtain the instance of radio data from the mobile device, separately obtain the corresponding vehicle location as described above, and then use the instance of radio data and the vehicle location as basis for generating or updating a radio map.

Advantageously, the disclosed approach could provide for numerous benefits to radio-based positioning system(s). As an initial matter, the disclosed approach could enable geo-referencing with significantly reduced power consumption (i.e., by the mobile device) compared to traditional techniques and could enable geo-referencing even at time(s) when a GNSS component of a mobile device is not enabled. This may help expand opportunities for collection (and geo-referencing) of radio data, and thus the amount of crowdsourced data collected by various mobile device(s) over time, which may in turn help improve accuracy, coverage, and/or reliability of radio map(s), among others. Moreover, it should be noted that vehicle location(s) could be determined based on GNSS and/or sensor data, among other possibilities, and thus such vehicle location(s) may often be more accurate than GNSS-based location(s) (e.g., location(s) determined solely based on GNSS), which may further help increase accuracy of radio map(s). Finally, the disclosed approach may become even more beneficial over time as availability and use of various transport system(s) further expands in the future e.g., due to deployment of autonomous vehicle(s) and/or improvement and expansion of transport infrastructure, among other possibilities.

Accordingly, in one aspect, disclosed is a method. The method involves: obtaining, by one or more processors, radio data associated with a mobile device, where the radio data is collected while the mobile device is located within a particular vehicle during a time of commute; determining, by the one or more processors, a particular location of the particular vehicle representing where the particular vehicle is or was located during the time of commute; and using, by the one or more processors, the particular location of the particular vehicle to geo-reference the radio data collected while the mobile device is located within the particular vehicle during the time of commute.

In another aspect, disclosed is an apparatus including one or more processors, a non-transitory computer readable medium, and program instructions stored on the non-transitory computer readable medium. The program instructions may be executable by the one or more processors to perform any operations described herein, such as any of those set forth in the disclosed method, among others.

In yet another aspect, disclosed is a non-transitory computer readable medium having stored thereon instructions executable by one or more processors to cause an apparatus to perform operations described herein, such as any of those set forth in the disclosed method, among others.

These as well as other features and advantages of the invention will become apparent from the following detailed description considered in conjunction with the accompanying drawings where appropriate. It should be understood, however, that the drawings are designed solely for purposes of illustration and not as a definition of the limits of the present disclosure. It should be further understood that the drawings are not drawn to scale and that they are merely intended to conceptually illustrate one or more of the features described herein.

DETAILED DESCRIPTION

Figure 1:
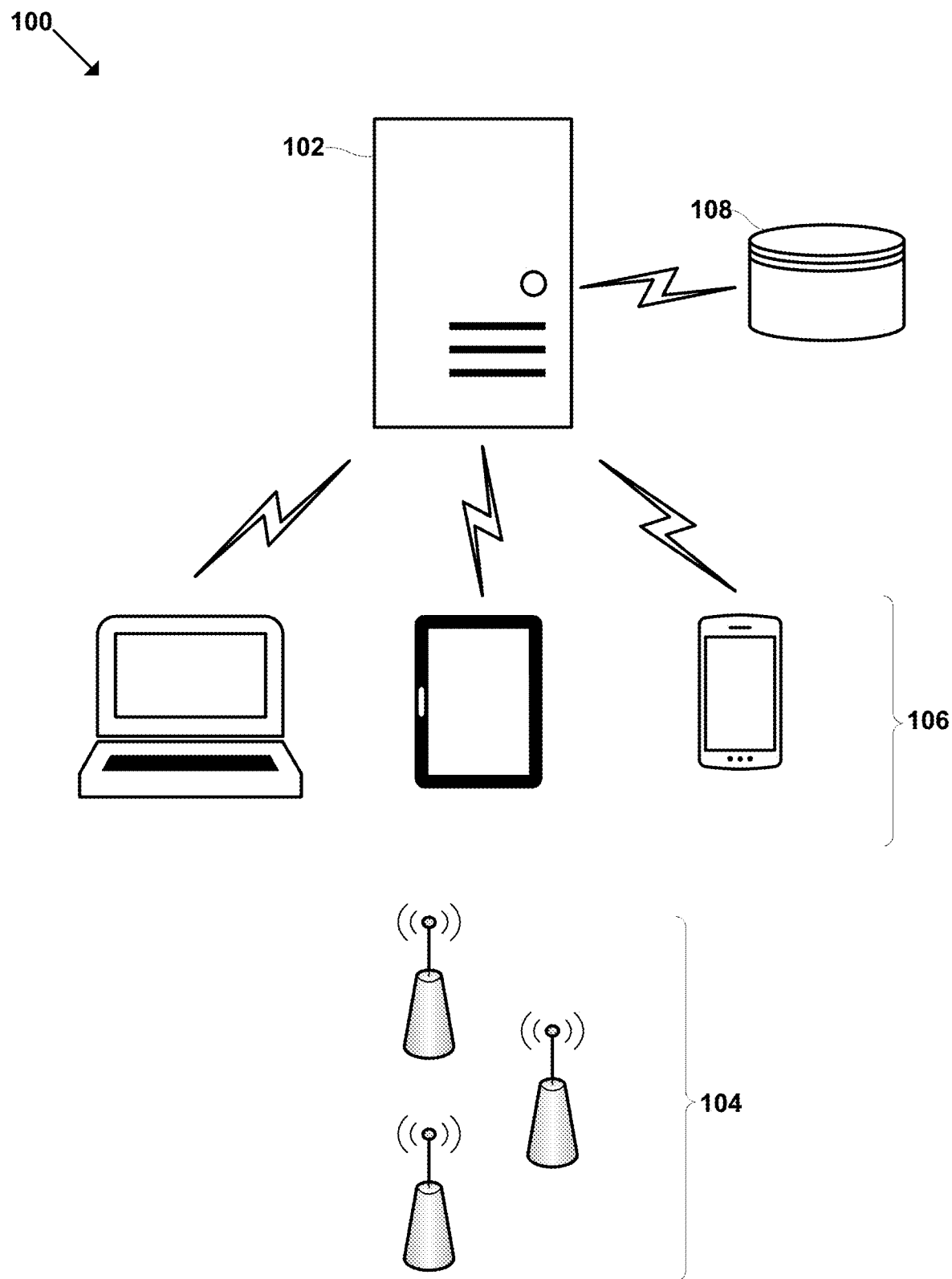
FIG. 1 illustrates an arrangement that may enable a positioning solution, in accordance with an example implementation.

Some embodiments of the present disclosure will now be described in more detail with reference to the accompanying drawings, in which some, but not all, embodiments of the present disclosure are shown. Indeed, various aspects of the present disclosure may be embodied in different forms and should not be construed as limited to the embodiments set forth herein.

I. Example System(s) for Indoor and/or Outdoor Positioning

Positioning methods that are seamless and available at all times might rely upon novel systems and solutions that are specifically developed and, if necessary, deployed for this purpose. Traditional positioning technologies, which are mainly used outdoors (e.g., satellite positioning technologies), cannot always deliver the desired performance that would enable a seamless navigation experience at all times, particularly indoors. For instance, in the case of indoor positioning, satellite-based radio navigation signals simply do not penetrate through the walls and roofs sufficiently for adequate signal reception and cellular signals often have a bandwidth that is too narrow for accurate ranging by default. And in the case of outdoor scenarios, there may be situations where e.g., satellite-based radio navigation provides for insufficient coverage, such as in the event of bad weather or in urban street canyons.

Several dedicated solutions have already been developed and commercially deployed during past years, such as solutions based on technologies like pseudolites (GPS-like short-range beacons), ultra-sound positioning, Bluetooth or Bluetooth LE signals, and wireless local area network (WLAN) and/or other network fingerprinting. What is typical to these solutions is that they tend to involve either deployment of totally new infrastructure (such as beacons or tags) and/or manual exhaustive radio-surveying of streets and buildings, including all the floors, spaces and rooms. Using such solutions may be rather expensive and will likely take a considerable amount of time to build the coverage to the commercially expected level. Also, the diversity of these technologies makes it difficult to build a globally scalable indoor positioning solution, and integration and testing will become complex if a large number of technologies needs to be supported in consumer devices.

A commercially successful positioning solution would likely be globally scalable, have low maintenance and deployment costs, and offer acceptable end-user experience. To facilitate this, the positioning solution can be based on existing infrastructure in the buildings and on existing capabilities in the consumer devices. For example, the positioning solution could be based on e.g., Cellular network infrastructure, Wi-Fi and/or Bluetooth, which are technologies already supported in numerous devices, such as smartphones, tablets, laptops and even in the majority of the feature phones. Thus, it is advantageous to develop a positioning solution that uses cellular and/or non-cellular radio signals in a way that (i) makes it possible to achieve desired horizontal and vertical positioning accuracy and (ii) provides the ability to quickly build global coverage.

FIG. 1 illustrates an arrangement 100 that may enable a positioning solution, in accordance with example implementations. Arrangement 100 could include a server system 102, radio devices 104 (could also be referred to as radio nodes or the like), one or more mobile devices such as mobile devices 106, and a database 108. The server system 102, radio devices 104, mobile device(s) 106, and/or database 108 may be configured to communicate with one another via one or more communication links (e.g., via a cellular and/or a non-cellular communication network).

As an initial matter, a mobile device could be any electronic device that is movable from one position to another. For example, the mobile device(s) 106 could be or otherwise include cellular phone(s), personal digital assistant(s), a laptop computer(s), tablet computer(s), and/or wearable device(s), among other options.

Further, radio devices 104 may include any type of device that is configured to emit (and optionally receive) radio signals. For example, the radio devices 104 could include wireless WLAN access point(s), such as a WLAN access point that supports or is otherwise configured according to the IEEE 802.11 standard (e.g., a Wi-Fi access point). Additionally or alternatively, the radio devices 104 could include Bluetooth beacon(s) and/or cellular network node(s) (e.g. Global System for Mobile Communications (GSM), Universal Mobile Telecommunications System (UMTS), Long Term Evolution (LTE), and/or 5G base station(s)), among other options.

Furthermore, server system 102 could take various forms without departing from the scope of the present disclosure. By way of example, server system 102 could include a single server or a plurality of servers (e.g., forming a server cloud). Moreover, server system 102 could be embodied as a positioning server of a positioning system, such as of a non-GNSS based radio positioning system for indoor and/or outdoor positioning.

In practice, a non-GNSS based radio positioning system could include or otherwise rely on radio devices (e.g., radio devices 104) to support the positioning solution described herein. Such radio devices may include dedicated radio devices (e.g., Bluetooth beacons) that are installed in the environment for which the positioning solution is provided. Additionally or alternatively, the non-GNSS based radio positioning system could make use of existing radio devices, such as WLAN access points and/or cellular network nodes. In any case, the radio devices could be deployed in particular area(s), which may be indoors and/or outdoors.

Given this arrangement 100, the server system 102 could generate and/or update a radio map for an area, which may in turn enable position estimations for mobile device(s) in the area. Namely, the radio map could enable an entity (e.g., a server system or a mobile device) to determine characteristics of radio signals (e.g., transmitted by radio devices) that are expected to be observable respectively at different locations in the area. Accordingly, the term radio map may refer to any collection of data that provides location-linked information on a radio environment.

To help facilitate generation or updating of a radio map, server system 102 could collect "fingerprint(s)" from mobile device(s). A fingerprint collected from a given mobile device may contain or otherwise represent measurement(s) by the mobile device and a position estimate (for geo-referencing e.g., radio data collected by the mobile device). The position estimate may be, for example, based on GNSS data, sensor data, and/or previously collected radio measurements, or may be manually inputted via a user interface. And the measurements may include, for example, radio signal parameter(s) of observed radio signals measured by a mobile device and/or identifiers of radio device(s) that emitted the observable radio signals, among others. In more specific examples, collected fingerprint(s) may respectively contain any feasible combination of the following types of measurements: global and/or local identifier(s) of cellular network node(s), Wi-Fi access point identifier(s), beacon identifier(s), signal strength measurement(s) (e.g., Received Signal Strength (RSS)), pathloss estimate(s), timing measurement(s) (timing advance or round-trip time), speed data, reference position measurement technology, collection device information, battery level data, and/or environment sensor data etc. Other examples are also possible.

In some implementations, collected fingerprints could enable generating or updating of a radio map for a 3D positioning solution e.g., in multi-level buildings. In particular, features of radio signals (e.g., received signal strength) that may be used for horizontal positioning may vary significantly from one building layer to another in different altitude levels at the same horizontal position, often due to the radio signal attenuation caused by a building's structure. This might affect the eventual performance of a radio-based positioning system. Therefore, it would be particularly beneficial for a radio map to indicate characteristics of radio signals that are expected to be observable respectively at different attitudes/floors of a multi-level building.

Given this, collected fingerprint(s) could additionally or alternatively include data representing or otherwise enabling determination of altitude(s) of mobile device(s). In particular, fingerprint(s) may include altitude data representing absolute and/or relative altitude(s) of a mobile device. Additionally or alternatively, fingerprint(s) may include pressure data representing pressure measurements, and such pressure data can be used to determine altitude(s) and/or altitude changes, e.g., according to a predictable relationship between pressure and altitude.

In practice, there may be various approaches for determining or otherwise generating altitude data. In one example, altitude data could be determined according to GNSS-based altitude estimate(s), which may work relatively well outdoors in good signal conditions, but may be unavailable or inaccurate indoors. In another example, altitude data could be determined according to an altitude map representing altitudes respectively at different locations. In yet another example, a barometer (e.g., in a mobile device) may provide altitude/pressure data (e.g., pressure measurements) that can be used to estimate or determine altitude changes of a mobile device. In this regard, reference altitudes, which may be GNSS-based and/or based on an altitude map, could be used in combination with altitude changes determined according to barometer measurements, so as to determine new altitude(s) of a mobile device. Other examples are also possible.

Generally, altitude data in a given fingerprint could represent altitude(s) of a mobile device substantially at the time the mobile device observed or otherwise determined certain (e.g., radio) measurements. For instance, a mobile device could provide, to server system 102, a fingerprint including radio measurement(s) by the mobile device and altitude data representing an altitude of the mobile device substantially during the radio measurement(s). And if the server system 102 has information indicating respective altitude(s) of floor(s) in a building, the altitude data in the fingerprint could be used to determine floor(s) at which the radio measurement(s) were performed. As such, server system 102 could associate certain altitude data with certain radio measurements, so as to generate or update a radio map to accurately represent characteristics of radio signals expected to be observable respectively at different attitudes/floors of an indoor area, which in turn could enable accurate positioning estimations, e.g., in a multi-level building.

Furthermore, because the above-described collection of fingerprint(s) is beneficial, such collection of fingerprint(s) could be part of a crowdsourcing process that occurs continuously or at least from time-to-time. For example, mobile devices of a large number of consumers could continuously transmit fingerprint(s) to the positioning server (e.g., server system 102) collecting the fingerprint(s). Consumers may consent to participation in such a collection process, if their device is equipped with necessary functionality to enable the fingerprint generation and/or collection at issue as a background process, naturally with the end-user consent. Also, it could be possible to use volunteers to actively survey area(s) so as to enable collection of fingerprint(s) for those area(s). Other examples are also possible.

Given that collection of fingerprint(s) may allow for understanding of how radio signals behave and travel in an area (e.g., a building), the server system 102 could use the collected fingerprint(s) in various ways to generate or update a radio map for the area.

By way of example, the server system 102 could define a grid having a plurality of points at e.g., intersecting lines. The server system 102 may define the grid to cover a site such that each grid point corresponds to a geographical location at the site. If the site (e.g., a building) comprises several floors, a separate grid may be defined for each floor, or a single three-dimensional grid may be defined with one dimension for the different floors.

Given this, if the server system 102 collects a fingerprint from a mobile device (e.g., a report that includes RSS value(s), associated radio device identifier(s), and/or other information as discussed), the server system 102 could map (i) RSS value(s) and/or associated radio device identifier(s) included in that fingerprint to (ii) the grid point corresponding to a geographical location that is closest to the position estimate indicated in that fingerprint. The server system 102 could perform such a process respectively for some or all fingerprint(s) collected from mobile device(s) in the site, so as to generate a grid-based radio map for the site.

In this example, if there are several RSS values for the same radio device that would be mapped to the same grid point, the server system 102 could determine an average value (e.g., arithmetic mean or median value) of those RSS values and associate the average value with the grid point at issue. On the other hand, for grid points to which no RSS values could be mapped due to missing fingerprint(s) from the corresponding areas at the site, the server system 102 could generate RSS values by interpolating surrounding RSS values if possible, and by extrapolating neighboring RSS values otherwise. In this way, the server system 102 could generate the radio map to identify radio devices and/or RSS values expected to be observed respectively at each of a plurality of locations throughout the site. Other (e.g., non-grid based) radio maps are also possible.

In some implementations, the radio map could include, be combined with, or otherwise correspond to another map or layout image representing features of an indoor and/or outdoor area at various locations in the area (e.g., an open area map for a pedestrian walkable area as further described herein). In the context of an indoor area, for instance, such features may include rooms, hallways, entryways (e.g., doors), vertical connectors (e.g., elevators, escalators, and/or stairs), and/or items situated in the indoor area (e.g., furniture), among numerous other possibilities. Given this, the radio map could indicate characteristics of the radio environment respectively at or nearby certain features in the area. Moreover, a mobile device could be configured to display such a radio map, to enable automatic or manual assessment of the radio environment in the area. Such an assessment could help determine whether sufficient extent of fingerprint(s) has been collected in a certain location (e.g., near a certain feature), and may provide other advantages as well.

Once a radio map is generated or updated, the server system 102 could store the radio map in a database 108, so that the server system 102 could refer the radio map or a portion thereof on an as-needed basis and/or so that the server system 102 provide the radio map or portion thereof (e.g., to a mobile device) on an as-needed basis for positioning purposes. Generally, the stored radio map could be associated with an indoor or other space (e.g., a particular building) for which the radio map provides coverage. And the server system 102 and/or a mobile device could select a radio map to be used for positioning purposes that is associated with an indoor (or other) space at which or next to which the mobile device is located. In practice, the server system 102 and/or a mobile device could determine an indoor space at which or next to which the mobile device is located based on GNSS measurement(s) by the mobile device and/or an identifier of an access point to which the mobile device is connected, among other options.

In one case, the server system 102 could use the radio map to estimate a position of a mobile device, such as in response to a request by the mobile device to do so. In particular, the server system 102 could receive, from the mobile device, a measurement report indicating identifiers of radio device(s) and/or RSS values that are observable by the mobile device at the current position of the mobile device, and possibly other radio characteristics observable by the mobile device. In some scenarios, the measurement report could optionally also include other information that might aid in determining a position estimate, such as e.g., barometric/altitude information that may assist in determining a floor level as part of the position estimate. Nevertheless, the server system 102 can compare information in the measurement report to the radio map, to determine a position estimate. For example, the server system 102 could determine that radio device identifier(s) and RSS value(s) in the measurement report substantially match radio device identifier(s) and RSS value(s) associated with a particular grid point corresponding to a particular geographical location at the site. In turn, the server system 102 could provide, to the mobile device, a position estimate indicative of the particular geographical location at the site.

In another case, the mobile device could use the radio map (or a portion thereof) to estimate its position. To facilitate this, the mobile device could obtain, from the server system 102, at least a portion of the radio map, and could at least temporarily store the radio map locally. Once the mobile device has the radio map locally stored thereon, the mobile device could use the techniques described above in association with the server system 102 so as to estimate its position (e.g., comparing information in a measurement report to the radio map). In this way, the mobile device could engage in "offline" positioning estimations.

Advantageously, the mobile device could engage in "offline" positioning estimations at times when connectivity between the mobile device and the server system 102 is unavailable, when it is desired to reduce a load on the server system 102 (e.g., reduce the extent of processing by the server system 102), when the mobile device seeks to obtain a position estimate relatively quickly (e.g., a very short time-to-first-fix), or in other situations.

In any case, a position estimate obtained using the above-described positioning solution could be used in various ways. For example, the mobile device could display (e.g., via a display device) an indoor navigation application including, e.g., an open area map of an indoor area and visually indicating a position of the mobile device in the indoor area in accordance with the position estimate obtained as described. Other examples are also possible.

Figure 2A:
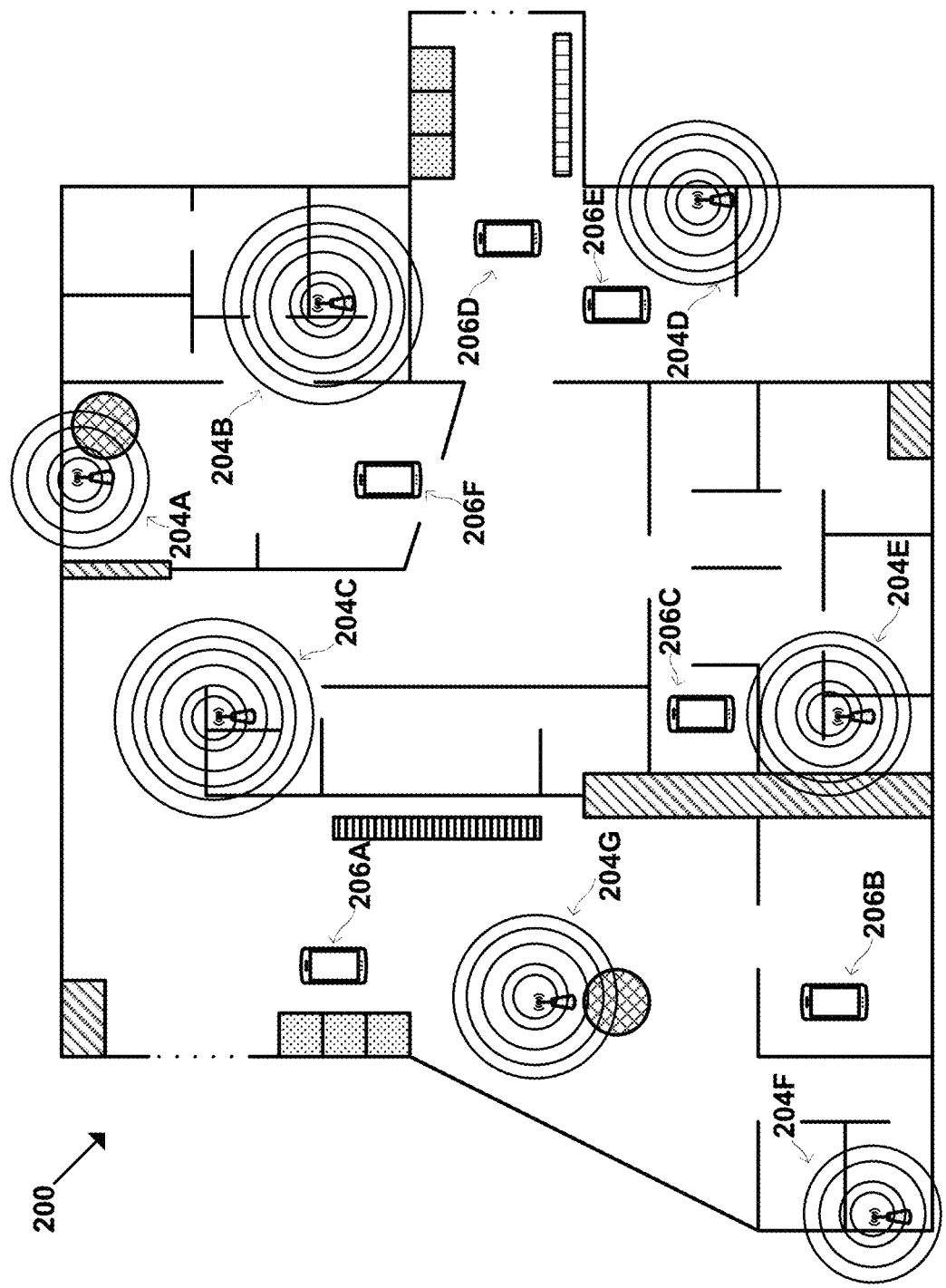
FIGS. 2A and 2B illustrate an indoor area at which radio device(s) and mobile device(s) can be located, in accordance with an example implementation.
Figure 2B:
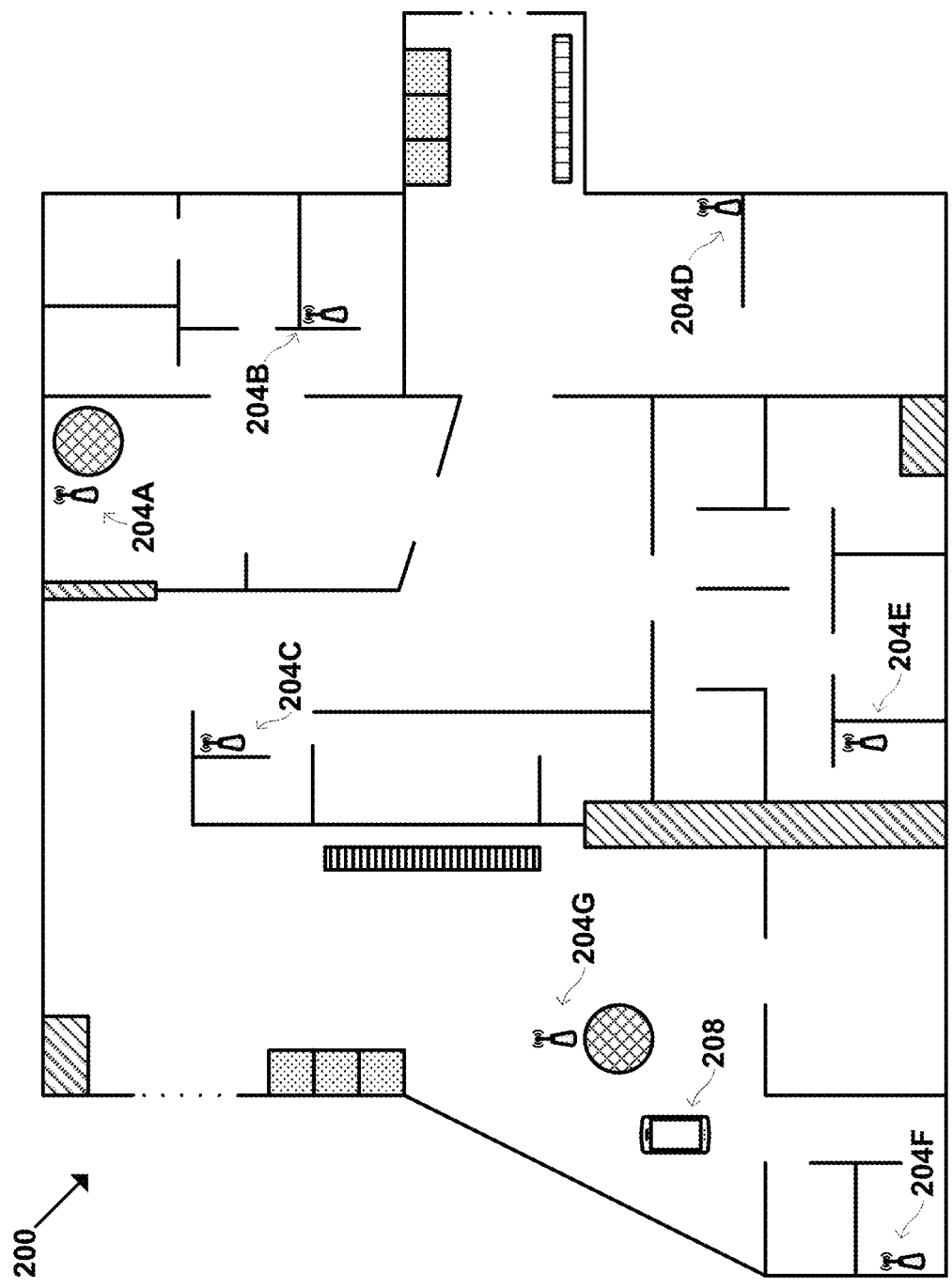
Figure 2C:
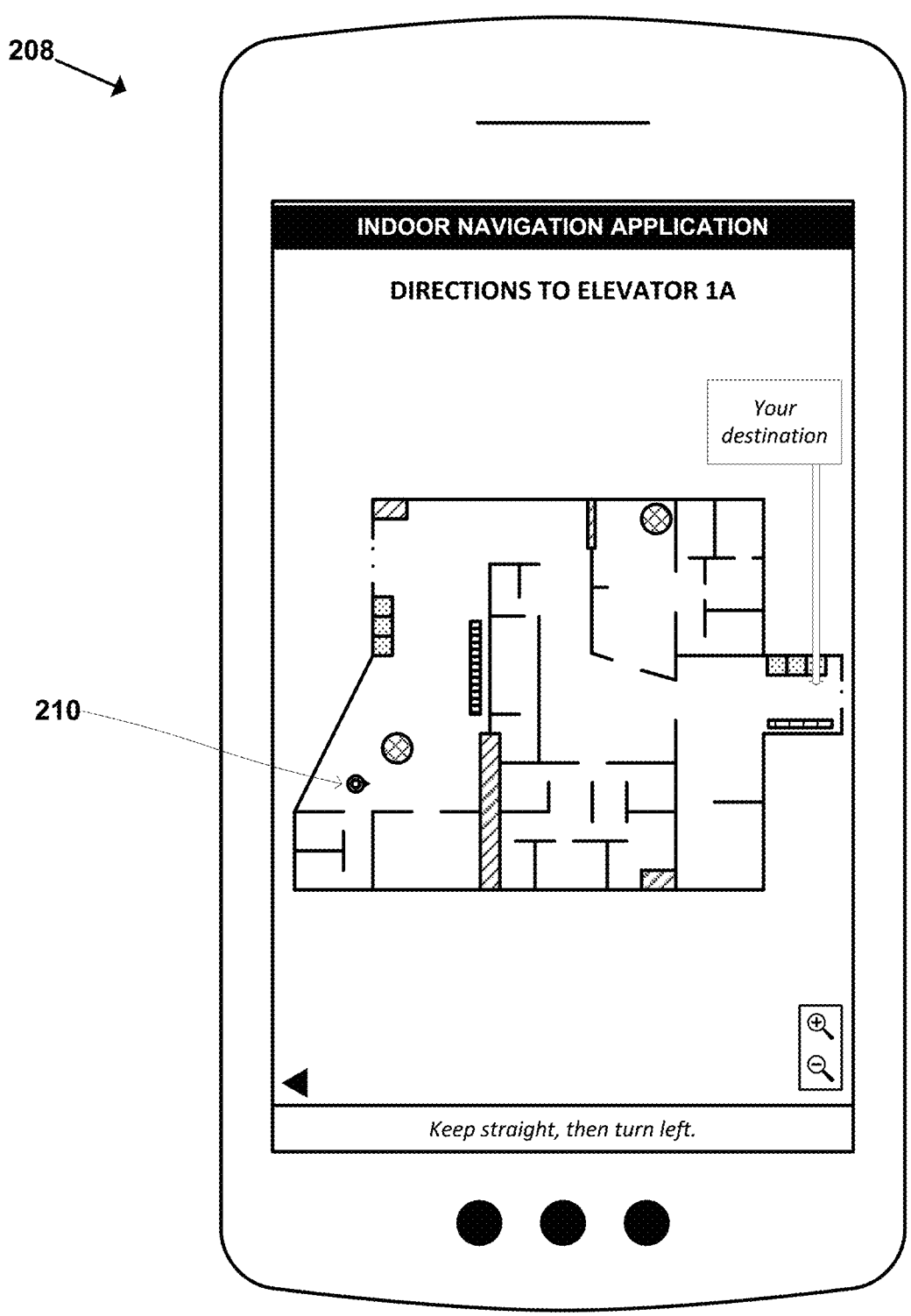
FIG. 2C illustrates an example indoor navigation application, in accordance with an example implementation.

FIGS. 2A to 2C next illustrate an example implementation and use of the above-described positioning solution. Although FIG. 2A to 2C illustrate an implementation in the context of an indoor scenario, it should be understood that the same or similar positioning solution could extend to apply in the context of various outdoor scenarios and implementations.

FIG. 2A illustrates an indoor area 200 taking the form of a floor in a building. As shown, several radio devices 204A-204G are positioned throughout the indoor area 200 and several mobile devices 206A-206F are positioned in and/or moving throughout the indoor area 200. Each of the radio devices 204A-204G emits radio signal(s). Of course, it should be understood that such radio signals are shown for illustration purposes only, and that the illustrated signals do not necessarily indicate coverage, strength, and/or other radio characteristics of those signals. In any case, the mobile devices 206A-206F may each respectively measure the radio signals at issue and then transmit, to a positioning server (e.g., server system 102), fingerprint(s) indicating position estimate(s) and the corresponding radio measurement(s). In turn, the positioning server may generate or update a radio map for indoor area 200 as described.

FIG. 2B illustrates a mobile device 208 that is positioned in and/or moving through the indoor area 200. The mobile device 208 could be one of the mobile devices 206A-206F that provided fingerprint(s) as described or could be a different mobile device. In either case, the mobile device 208 could observe characteristics of the radio environment at its current position by measuring radio signals emitted by one or more of the radio devices 204A-204G. The mobile device 208 could then refer to the radio map that was generated or updated as described in associated with FIG. 2A, and could determine a position estimate based on the radio characteristics and the radio map as described. Alternatively, the mobile device 208 could transmit, to the positioning server, a request for a position estimate (e.g., a measurement report), which may indicate the observed radio characteristics at issue. In turn, the position server could determine a position estimate based on the radio characteristics and the radio map as described and could then provide the position estimate to the mobile device 208 in response to the request.

FIG. 2C then illustrates how the mobile device 208 could use the position estimate that was determined using the above-described solution. As shown, the mobile device 208 could display an indoor navigation application that includes an open area map of the indoor area 200 as well as a visual indicator 210 of the mobile device 208's position in accordance with the position estimate at issue. Accordingly, the navigation application could use position estimates obtained as described in order to accurately display the current position of the mobile device 208 and/or to help a user of the mobile device 208 accurately navigate through the indoor area 200, among numerous other possibilities. Other illustrations are also possible.

II. Example Vehicle-Device Arrangement

Figure 3:
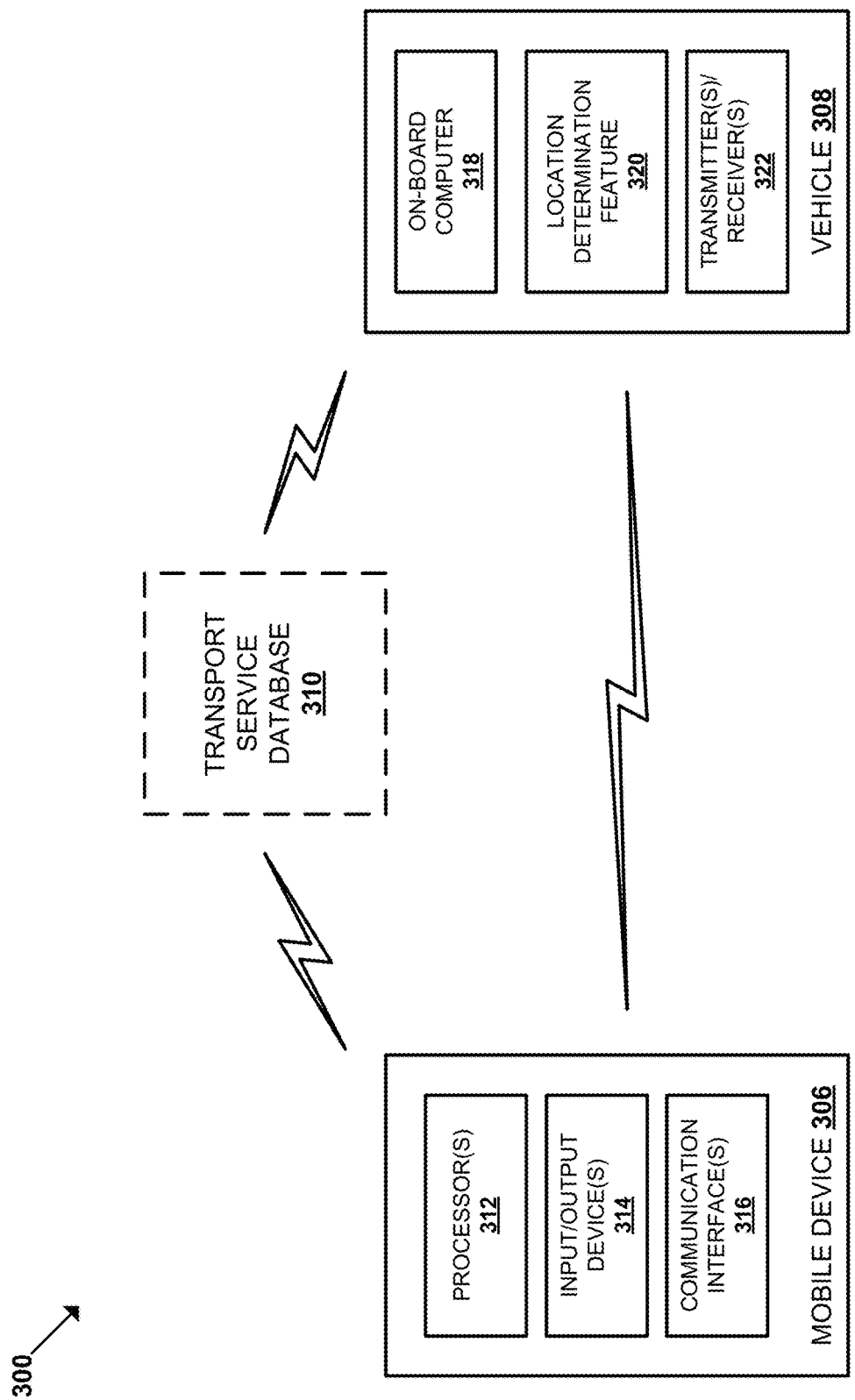
FIG. 3 illustrates an arrangement that may enable improved data collection, in accordance with an example implementation.

FIG. 3 illustrates an arrangement 300 that may enable improved data collection, in accordance with an example implementation. Arrangement 300 could include a mobile device 306 (e.g., such as mobile device 106), vehicle 308, and (optionally) a transport service database 310. The mobile device 306, vehicle 308, and/or database 310 may be configured to communicate with one another via one or more communication links, such via radio communication links and/or via a cellular and/or a non-cellular communication network, among other options.

As an initial matter, a mobile device could be any electronic device that is movable from one position to another. For example, in line with the discussion above, a mobile device 306 could be or otherwise include cellular phone(s), personal digital assistant(s), a laptop computer(s), tablet computer(s), and/or wearable device(s), among other options.

In practice, such a mobile device 306 may include at least processor(s) 312, input/output device(s) 314, and communication interface(s) 316, among other components further contemplated herein. Processor(s) 312 may be configured to e.g., execute program code to cause mobile device 306 to perform and/or control operations, such as any of those described herein and/or other operations. Also, device(s) 314 may include e.g., display device(s), audio device(s) or the like for (e.g., visually and/or audibly) providing information (e.g., to a user). Additionally or alternatively, device(s) 314 may include e.g., a keyboard, keypad, touchpad, mouse, or the like for receiving information (e.g., based on input provided by a user). Furthermore, communication interface(s) 316 could enable the mobile device 306 to communicate with and/or obtain information related to other entities. The communication interface(s) 316 may, for instance, include a wireless interface (e.g., a cellular radio communication interface and/or a WLAN interface) and/or wire-bound interface (e.g., an IP-based interface, for instance to communicate with entities via the Internet). Moreover, the communication interface(s) 316 may take the form of or provide for wireless and/or wired communication with transmitting and/or receiving device(s), such as one or more antenna(s) and/or radio receiver(s) of mobile device 306.

Yet further, vehicle 308 may include any means for carrying and/or transporting people and/or goods. For example, a vehicle could be or otherwise include a car, a bus, a truck, a motorcycle, a van, a bicycle, a scooter, or a cart, among numerous other possibilities. Although embodiments of the present disclosure may be mostly described in the context of a bus, it should be understood that such embodiments may extend to apply to any feasible type of vehicle without departing from the scope of the present disclosure.

In practice, a vehicle 308 may include an on-board computer 318, a location determination feature 320, and/or transmitter(s)/receiver(s) 322. Of course, a vehicle 308 may additionally or alternatively include other components as understood by one of ordinary skill in the art without departing from the scope of the present disclosure.

Generally speaking, the on-board computer 318 may be configured to perform numerous operations including, but not limited to, controlling vehicle operations, engaging in communication with other vehicle components (e.g., vehicle sensor(s) (not shown)), and/or engaging in communication with external entities (e.g., mobile device 306 and/or database 310), perhaps using transmitter(s)/receiver(s) 322. In some cases, on-board computer 318 may be configured to control vehicle operations in an autonomous, assisted driving mode, or the like.

Additionally, location determination feature 320 of vehicle 308 could be any mechanism that enables determination of the vehicle 308's location. For instance, feature 320 may leverage any feasible combination of the following technologies to enable determination of the vehicle 308's location: GNSS-based positioning, sensor-based positioning, radio-based (e.g., Wi-Fi and/or Bluetooth®) positioning, image-based positioning, and/or visual localization etc.

Further, transmitter(s)/receiver(s) 322 may be any device(s) that enable a vehicle 308 to transmit and/or receive information to/from other entities, such as mobile device 306 and/or database 310. For example, transmitter(s)/receiver(s) 322 may include radio transmitter(s) and/or receiver that can emit and/or receive radio signals according to one or more communication standards or protocols, such as Bluetooth®, Wi-Fi (e.g., IEEE 802.11), Near Field communications (NFC), and/or Cellular (e.g. Global System for Mobile Communications (GSM), Universal Mobile Telecommunications System (UMTS), Long Term Evolution (LTE), and/or 5G), among others.

Finally, the transport service database 310 may be a third-party or other database that may contain information about vehicle(s) (e.g., vehicle 308) that can be used by individual(s) as part of vehicle-based service(s). This may include public transport service(s) (e.g., buse(s) and/or train(s)), taxi service(s), ride-share service(s), and/or vehicle rental service(s), among others.

In practice, database 310 could be a standalone database, or could be incorporated within or otherwise associated with a server (not shown). Such a server may be configured to engage in communications with various entities (e.g., mobile device 306 and/or vehicle 308), and/or to add, remove, and/or update information in the database 310. In some implementations, the database 310 or portion thereof could be accessible to the mobile device 306 e.g., via an application that is running on the mobile device 306, which may be a navigation application in communication with the database 310 or a transport service application associated with the transport service database 310 (e.g., provided by the third-party entity responsible for the database 310), among other options. For instance, the mobile device 306 could continuously or from time-to-time download, request, and/or otherwise obtain information from the database 310, such as location information related to the vehicle(s) (e.g., buse(s)) in the vicinity (e.g., within a threshold distance of) the mobile device 306, vehicle(s) to be used during a desired route (e.g., selected via the application), or the like. Other implementations are also possible.

Database 310 may include information about vehicles' respective locations along with corresponding time(s) and/or vehicle parameter(s), such as plate number, make, model, and/or vehicle identifier etc. For instance, the information in the database 310 may associate each respective vehicle location with one or more respective parameters of a respective vehicle from among a plurality of vehicles. Such a database 310 may represent information for vehicles globally, locally, and/or for specific areas, among other options. Additionally or alternatively, the information in the database 310 may associate each respective vehicle location with one or more time(s), to indicate the time(s) at which a given vehicle is or was at a given location. So, the locations at issue may include substantially real-time locations, most recently acquired locations of vehicles and/or previous locations of vehicles, among other possibilities.

In practice, the locations in the database 310 could be represented in various ways without departing from the scope of the present disclosure. For example, a given location in the database 310 could be represented in the form of global and/or local geographic coordinates. Additionally or alternatively, a given location in the database 310 could be represented by an identifier of a point of interest, a particular street address, a name of an intersection, or the like, any one of which could be converted to geographic coordinates using e.g., geocoding tools/techniques, among others. Other examples are also possible.

Furthermore, database 310 can be established in various ways. For example, on-board computer(s) 318 of a vehicle 308 could write location information to the database 310 and/or positioning server(s) could determine and write such location information to the database 310 on behalf of the vehicle(s), among other possibilities. In another example, on-board computer(s) 318 of a given vehicle 308 could respectively write, to the database 310, information about the vehicle 308, such as about the above-mentioned parameters. Additionally or alternatively, any feasible information could be manually added, removed, and/or modified, such as by individual(s) associated with the transport service or other entity responsible for the database 310, among others.

Accordingly, in a system arranged as described, the mobile device 306 could access database 310 and/or communicate with vehicle 308, so as to help enable the improved data collection as described herein.

III. Illustrative Methods

As noted above, the present disclosure is directed to an improved approach for geo-referencing radio data collected by mobile device(s) during the crowdsourcing process. As discussed, it is common to use e.g., a GNSS component (possibly in combination with sensor data) for geo-referencing of radio data. But use of a GNSS component could lead to extensive power consumption by a mobile device over time. Yet, the disclosed approach overcomes this issue through the unique realization that mobile device(s) could determine or otherwise obtain respective location(s) of at least some vehicle(s) on which user(s) commute, and do so with significantly less power consumption compared to that of using GNSS for geo-referencing. Advantageously, leveraging a vehicle's location in this manner could also enable geo-referencing at time(s) when a GNSS component of a mobile device is not enabled, which may expand opportunities for collection of radio data and thus the amount of crowdsourced data collected by various mobile device(s)

over time. Moreover, such vehicle location(s) may often be even more accurate than GNSS location(s), which makes the disclosed approach particularly beneficial from a technical standpoint, as use of transport systems expands and the need for highly accurate and reliable radio maps become even more apparent over time.

Generally, the disclosed approach could be performed by a mobile device (e.g., mobile device 106) and/or a positioning server (e.g., server system 102). However, for sake of simplicity, the disclosed approach may generally be described herein as being performed by processor(s) (e.g., of the mobile device and/or the positioning server), with reference to specific entities as applicable.

In accordance with the present disclosure, processor(s) may obtain radio data associated with a mobile device during a time of commute.

More specifically, a user of the mobile device could use a vehicle (e.g., a bus or other public transportation) for a commute, which may be any journey between an origin and a destination (e.g., between the user's home and place of work or study). And the time of commute could be considered as one or more particular times (e.g., time(s) of day and/or date(s)) and/or time frame(s) during which at least a portion of the journey occurred or is occurring.

During at least some time(s) of the commute, the user's mobile device could collect radio data, such as in accordance with the crowdsourcing process described above. For instance, the mobile device could observe signal(s) emitted by radio node(s) in the environment of the vehicle, such as any indoor and/or outdoor radio node(s) (e.g., WLAN access points and/or cellular network nodes) observable by the mobile device while the vehicle moves or is stationary during the journey. As such, the mobile device could record information based on measurement(s) of such signal(s), which may include e.g., RSS value(s), round-trip time value(s) and/or respective identifiers of the radio node(s), among other possibilities.

In some implementations, the processor(s) and/or radio node(s) could respectively timestamp instances of collected radio data, so that this time-based information can be leveraged as further described herein. In this regard, a given timestamp may indicate the time at which an instance of the radio data is generated, the time a radio signal (i.e., based on which the radio data is generated) is observed by the mobile device, and/or a time that the radio signal is emitted by the corresponding radio node, among other options.

Furthermore, the processor(s) could collect the radio data at issue regardless of the state of the mobile device. In particular, as discussed, a mobile device may typically attempt to limit or otherwise reduce extensive resource consumption by contributing crowdsourced data only at certain time(s), such as e.g., at time(s) when the mobile device actively uses both location (e.g., GNSS) and radio resources (e.g., when a user of the mobile device is using a navigation application on the mobile device.) However, the disclosed approach effectively enables the mobile device to contribute crowdsourced data at any time without many or any restriction(s). For instance, a mobile device's operating system or other application or service could perform standard network measurement(s), such as e.g., when the operating system regularly scans Wi-Fi network(s). So, the processor(s) could leverage these standard measurements as part of the disclosed process for geo-referencing, whether or not the GNSS component of the mobile device is enabled and/or a navigation application is being used. Other advantages are also possible.

During or after collection of the radio data, the processor(s) could determine location(s) of the vehicle representing where the vehicle is or was located during the time of commute. In some cases, the processor(s) could determine the vehicle location(s) in 'real-time', such as substantially during the commute. In other cases, the processor(s) could determine the vehicle location(s) in a post-processing manner, such as after some or all the radio data has been collected. In either case, the vehicle location(s) could be determined or otherwise obtained by the mobile device and/or by the positioning server, among other possibilities.

Generally speaking, the processor(s) could determine a vehicle location in various ways. Although certain example techniques for determining a vehicle location are described herein, it should be understood that other technique(s) may be leveraged as well without departing from the scope of the present disclosure.

In one example implementation, the processor(s) could obtain a vehicle location from a transport service provider (e.g., a city authority or a transit company). For instance, the mobile device may be running a transport service application from the transport service provider, and the transport service application could communicate with that provider's database (e.g., transport service database 310) or server, which may contain information about location(s) of vehicle(s) associated with the provider (e.g., buses and/or trains operated by the transit company). Given this, the processor(s) could identify the particular vehicle on which the user is or has commuted and could obtain the location(s) of the particular vehicle associated with the time of commute.

By way of example, the mobile device and/or the positioning server could establish communication (e.g., via the application or a web address of the transport service provider) with the transport service server that can access the provider's database, could send a request to the transport service server containing at least identity of the particular vehicle, and could responsively receive vehicle location data indicating location(s) of the particular vehicle in accordance with the identification. Additionally or alternatively, the mobile device and/or the positioning server could obtain the vehicle location(s) directly from the transport service application, as the application may anyways obtain such location information continuously or from time-to-time e.g., for purposes of presenting such location information to user(s) via a graphical user interface or the like.

In another example implementation, the processor(s) could obtain a vehicle location directly from the particular vehicle on which the mobile device's user is or was commuting. As an initial matter, the mobile device and/or the positioning server could establish communication with the particular vehicle, such as with an on-board computer of the particular vehicle (e.g., on-board computer 318) e.g., via an access point on the particular vehicle (e.g., via transmitter(s)/receiver(s) 322) or the like. The on-board computer could have access to or stored thereon information indicating current, recent, and/or previous location(s) of the particular vehicle, which may be obtained from a transport service provider and/or determined by a location determination feature on-board the particular vehicle (e.g., location determination feature 320). Thus, the processor(s) could obtain or request vehicle location data from the on-board computer of the particular vehicle.

Additionally or alternatively, the particular vehicle could continuously or from time-to-time broadcast its location(s) and perhaps its identity, and the processor(s) could read broadcasted message(s) to obtain the vehicle location(s). For instance, the mobile device's communication interface(s) could receive the broadcasted message(s) and provide the message(s) to the mobile device's or the positioning server's processor(s) for further processing to obtain the vehicle location(s). In some implementations, optionally, the processor(s) could separately determine identify of the particular vehicle and could verify that the broadcasted message(s) indicate location(s) of that particular vehicle in accordance with the determined identity and the identity indicated in the broadcasted message(s). Other implementations are also possible.

Regardless of the implementation, the processor(s) could identify a portion of the vehicle location data that is associated with the particular vehicle and the time of commute. As an initial matter, as noted above, the processor(s) could provide identity of the particular vehicle so as to obtain location information for that particular vehicle. In some cases, the processor(s) may obtain or explicitly request current or recent location(s) of the particular vehicle, which may be beneficial for a real-time implementation of the disclosed approach. In other cases, the processor(s) may specify time(s) (e.g., time(s) of the commute), so that an entity (e.g., the transport service server or the particular vehicle itself) could provide vehicle location(s) indicating where the particular vehicle is or was located at those specified time(s). In yet other cases, the processor(s) could obtain a dataset containing vehicle location data indicating a plurality of locations respectively of a plurality of vehicles and could filter the vehicle location data based on identity of the particular vehicle and time(s) associated with the commute, so as to identify the portion of the vehicle location data indicating location(s) of the particular vehicle during the time of commute. Other cases are also possible.

In some implementations, vehicle location(s) may be respectively timestamped to indicate time(s) when the particular vehicle is or was at certain respective locations. Such timestamping could be performed by the processor(s), by the particular vehicle, and/or by the transport service provider (e.g., by the application or server of the transport service provider), among others. Regardless of which entity performs the timestamping, the timestamp may indicate a time that the location is determined, a time at which an instance of a vehicle location is generated, a time at which the instance of the vehicle location is received by the processor(s), and/or a time at which the instance of the vehicle location is transmitted to the processor(s), among others.

Furthermore, in the event that the processor(s) need to determine identity of the particular vehicle as part of the above-described process for determining the vehicle's location, the processor(s) could determine the identity in various ways. Although certain example techniques for identifying the particular vehicle are described herein, it should be understood that other technique(s) may be leveraged as well without departing from the scope of the present disclosure.

In one example, the processor(s) could identify the particular vehicle based on identification data from the transport service application or database. For instance, a user of the mobile device could select or view (a 'user-selection'), on the transport service application, (i) information about the particular vehicle (e.g., a schedule for a public transport bus) and/or (ii) a route associated with the vehicle (e.g., a route that involves use of the particular vehicle for transport). Such user-selection of the particular vehicle or the route could trigger the transport service application or server to provide at least information identifying the particular vehicle to the processor(s). Additionally or alternatively, the user-selection could trigger the processor(s) to request information about identity of the particular vehicle from the transport service application or server. In either case, the processor(s) could identify the particular vehicle based on the received information. Numerous variations of this example technique are possible as well.

In another example, the processor(s) could identify the particular vehicle by matching the coarse location of the mobile device with location data of the particular vehicle.

For instance, the processor(s) could determine one or more coarse locations of the mobile device during the time of commute, as well as respective locations of one or more vehicles during the time of commute. The processor(s) could determine the device's coarse location(s) e.g., based on network information from an access point observable by the device. The network information may indicate location of the access point or may indicate identity of the access point, so that the processor(s) could refer to an access point database to obtain location of the access point according to the identity. In either case, location of the access point may be used as or as basis for determining the coarse location of the mobile device. Further, the processor(s) could determine respective locations of one or more vehicles based on information from a transport service provider, such as from transport service database 310, which may include information about vehicles' respective locations along with corresponding time(s), as described above.

In any case, the processor(s) could identify the particular vehicle (from among the one or more vehicles for which location(s) are determined) based on (i) the one or more respective locations of the particular vehicle during the time of commute substantially matching (ii) the one or more coarse locations of the mobile device during the time of commute. In other words, the vehicle whose track substantially matches the track of the mobile device from a temporal and spatial standpoint could be considered as the particular vehicle that is or was used for the commute. Generally speaking, the track of the mobile device can be considered as substantially matching with a given vehicle track if e.g., at least a predefined number of locations of the mobile device are within a pre-defined distance (e.g., 50 meter) and time (e.g., 0.5 seconds) from the corresponding location(s) of the vehicle. Numerous variations of this example technique are possible as well.

In yet another example, the processor(s) could obtain identity of the particular vehicle directly from the particular vehicle. For instance, the particular vehicle could be configured to broadcast the identity continuous or from time-to time, such as via an access point on the particular vehicle or the like. The mobile device could obtain and read such a broadcasted message, to determine identity of the particular vehicle. Other examples are also possible.

Moreover, the processor(s) could match instances of radio data respectively with vehicle location(s), so that the vehicle location(s) could respectively be used to geo-reference the instance(s) of radio data. For instance, the mobile device or positioning server could substantially match a given instance of radio data to a given vehicle location based on timestamps respectively contained in the radio and location data at issue. In practice, such a match can be established or otherwise determined if e.g., the time associated with the instance of radio data is within a pre-defined time value (e.g., 2 seconds) from the time associated with the vehicle location, among other possibilities. In this way, the processor(s) could use a vehicle location to geo-reference radio data in either a real-time manner and/or using a post-processing approach.

Yet further, the process of geo-referencing or enabling geo-referencing in the context of the disclosed approach could take various forms.

For example, the mobile device could determine and provide, to the positioning server, information indicating both an instance of radio data and a location of the vehicle that substantially matches the instance of radio data, so that the location at issue can be used to reference location of the mobile device substantially during the radio data collection. In practice, this could involve the mobile device generating and providing a fingerprint indicating the radio data and vehicle location. The positioning server could receive the fingerprint and use the fingerprint as basis for generating or updating a radio map, as described herein. For instance, in line with the discussion above, the positioning server could map (i) an RSS value(s) and/or associated radio device identifier(s) included in that fingerprint to (ii) a grid point corresponding to a geographical location that is closest to vehicle location indicated in that fingerprint.

In another example, the mobile device could provide, to the positioning server, an instance of radio data, and the positioning server could separately determine the vehicle location. Specifically, the mobile device could provide a timestamped instance of radio data and identity of the particular vehicle, and the positioning server could determine the vehicle's location as described based on the indicated time as well as on identity of the vehicle. Alternatively, the mobile device could provide an indication of a time associated with the instance of radio data as well as identity of the particular vehicle, and could do so before or after providing of the radio data, so that the positioning server's process of determining the vehicle location could occur independently from (e.g., before) receipt of the radio data. This alternative approach could enable the mobile device to send a batch of instances of radio data rather than repeatedly send radio data to the positioning server, which may reduce bandwidth usage on communication channel(s) and/or may provide for other benefits. In either case, the positioning server could in turn use the received radio data and the determined vehicle location as basis for generating or updating a radio map, such that the vehicle location is used to geo-reference the radio data. In this way, the mobile device can effectively offload the location determination process to the positioning server, thereby further reducing use of the mobile device's resources. Other examples are also possible.

In a further aspect, the disclosed approach could be arranged such that collection of radio data during a commute could automatically trigger use of a vehicle location to geo-reference the radio data. For instance, the processor(s) could determine that the radio data is or was collected during a commute associated with the mobile device. The processor(s) could do so (i) by determining usage of a transport service application substantially during or immediately before (e.g., within a pre-defined time frame before) collection of the radio data, (ii) by determining that the mobile device is on a vehicle used for commute e.g., using the above-described track matching technique, and/or by referring to historical commute data indicating time(s) (e.g., time(s) of the day and/or day(s) of the week) that the mobile device typically participates in the commute, among other options. In any case, once the processor(s) determined that the radio data is or was collected during a commute, the processor(s) could responsively use a vehicle location (e.g., of the particular vehicle used for commute) to geo-reference the radio data.

In yet a further aspect, the processor(s) could trigger collection of radio data in response to determining that the commute is taking place or about to take place. For instance, the processor(s) could determine that the commute associated with the mobile device is occurring or about to occur. Similarly, the processor(s) could do so i) by determining usage of a transport service application, which may occur substantially during or immediately before the commute, (ii) by determining that the mobile device is on a vehicle used for commute, and/or by referring to historical commute data indicating time(s) that the mobile device typically partakes in the commute on the particular vehicle or vehicle type, among other options. In any case, the processor(s) could respond to a determination that the commute is occurring or about to occur by causing the mobile device to collect radio data for duration of the commute or at least from time-to-time during the commute, among other options.

In yet a further aspect, location(s) determined as part of the disclosed approach could be leveraged for successful outdoor-to-indoor transitions. In particular, collection of radio data in accordance with the disclosed approach can help ensure that an accurate outdoor mobile device location is determined in anticipation of an outdoor-to-indoor transition, to then enable accurate indoor navigation to the specific indoor location (e.g., using dead reckoning or the like), as further contemplated herein. For example, vehicle(s) used for commute(s) could travel nearby building(s), which individual(s) may enter and navigate through following a commute on the vehicle(s), thereby making the disclosed approach beneficial for accurately determining an outdoor location near a building that enables a successful outdoor-to indoor transition. Accurately determining an outdoor location for geo-referencing in line with the disclosed approach may be particularly beneficial in urban canyon(s) where a GNSS may be unavailable or not sufficiently accurate. Other aspects are also possible.

Figure 4:
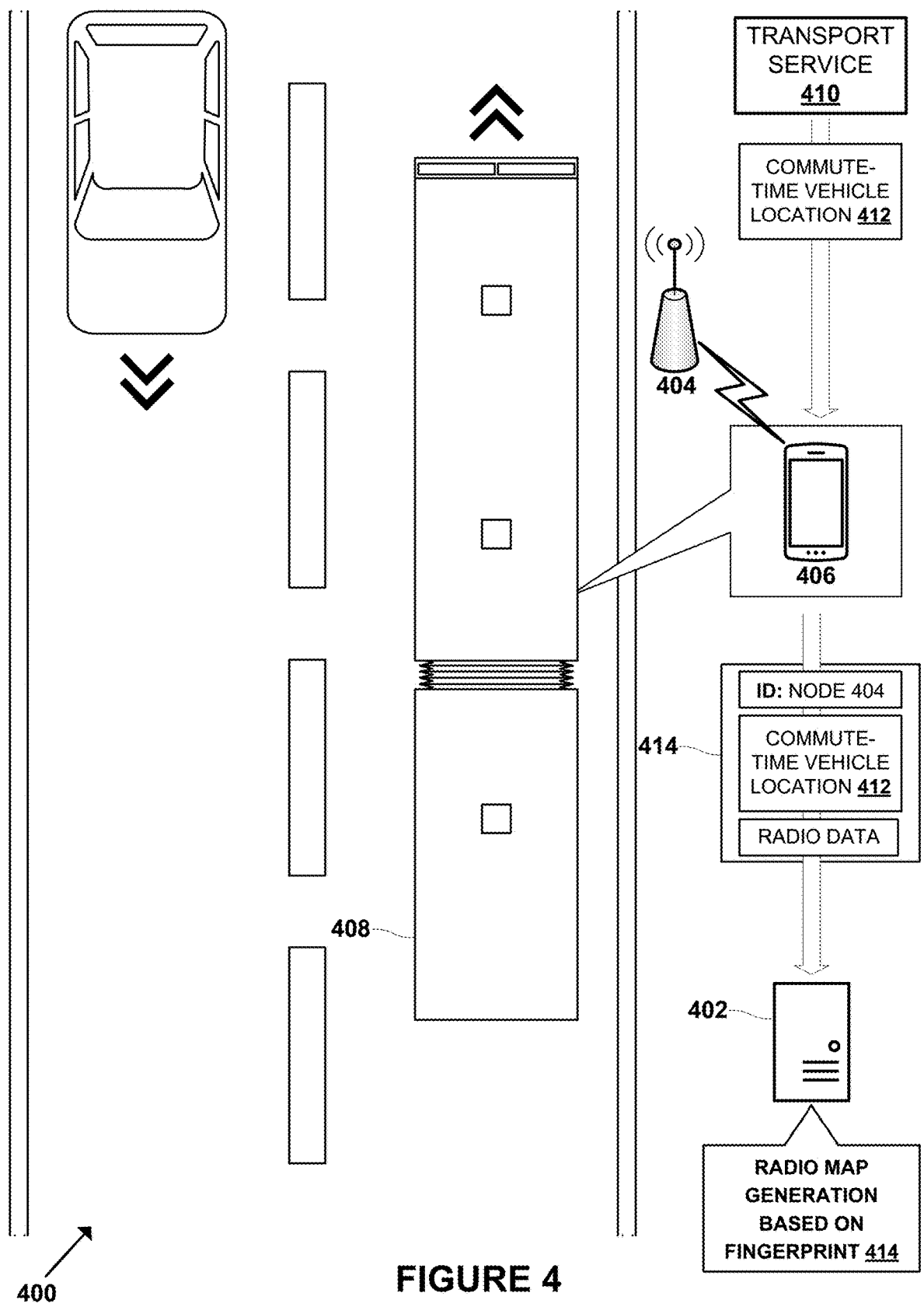
FIG. 4 illustrates an example scenario of using a vehicle location to geo-reference radio data, in accordance with an example implementation.

FIG. 4 next illustrates an example scenario in which a mobile device 406 (e.g., taking the form of mobile device 106 and/or 306) uses a public transport bus 408's location to geo-reference radio data collected during a time of commute. In particular, a user of the mobile device 406 may be commuting on the public transport bus 408. During the commute, as shown, the mobile device 406 could collect radio data associated with radio node 404, which may be fixed at a location in the environment of the bus 408 for at least a portion of the bus 408's journey. Additionally, substantially at the time of collecting the radio data, the mobile device 406 could engage in communication with a transport service 410 to obtain a location 412 of the bus 408 corresponding to the time of the radio collection at issue. In turn, the mobile device 406 could generate a fingerprint 414 including the collected instance of radio data and indicating identity of the radio node 404 as well the commute-time vehicle location 412 of the bus 408. The mobile device 406 could in turn provide the generated fingerprint 414 to a positioning server 402 (e.g., taking the form of server system 102), and the positioning server 402 could then engage in generation of a radio map based on the received fingerprint 414, in line with the techniques described herein. In this way, the mobile device 406 could contribute crowdsourced data to a positioning system, with reduced power consumption compared to previous techniques that often use a GNSS component of the mobile device. Other advantages and illustrations are also possible.

Figure 5:
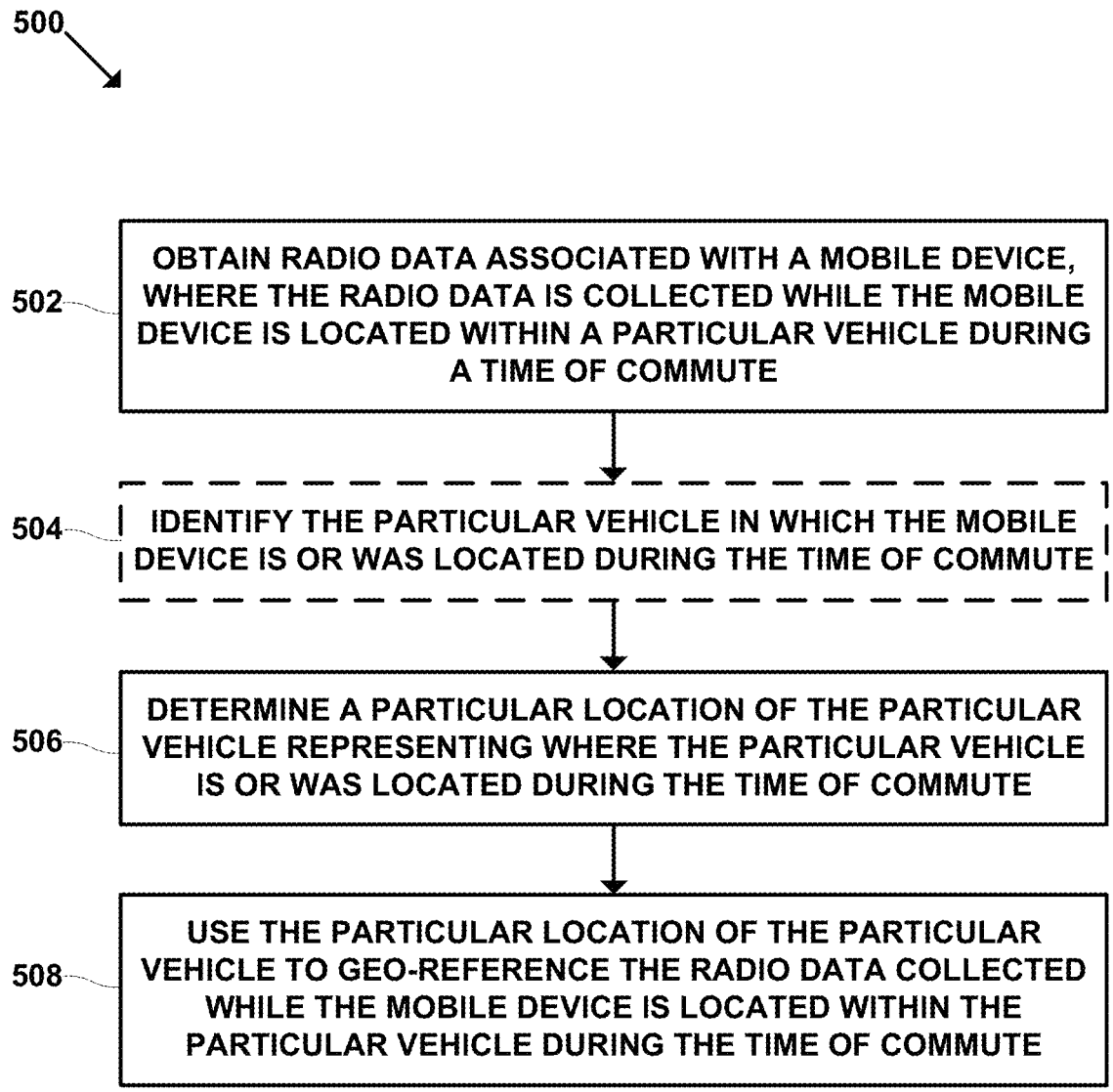
FIG. 5 is an example flowchart related to using a vehicle location to geo-reference radio data, in accordance with an example implementation.

FIG. 5 is next a flowchart illustrating a method 500, in accordance with the present disclosure. Method 500 could be performed by and/or in an arrangement involving a mobile device, a server device, and/or any other device or system. Also, it should be understood that, if a method is performed by a given entity, the given entity could engage in communication(s) with one or more other entities as necessary to obtain and/or provide any feasible information as understood by one of ordinary skill in the art, to enable the given entity to perform operations described herein and/or to inform another entity about results, among other possibilities. Moreover, in some implementations, the various operations described herein could be distributed among one or more entities, such as in accordance with a client-server arrangement or the like.

In an example implementation, method 500 could be performed by and/or in arrangement(s) (e.g., arrangements 100 and/or 300) involving a device (e.g., mobile device 106) and/or a server (e.g., server system 102) or more particularly by component(s)/module(s) (e.g., processor(s)) thereof, among other possibilities.

As shown, method 500 involves operations in accordance with blocks 502 to 508. In particular, at block 502, method 500 may involve obtaining radio data associated with a mobile device, where the radio data is collected while the mobile device is located within a particular vehicle during a time of commute. Also, at (optional) block 504, the method 500 may involve identifying the particular vehicle in which the mobile device is or was located during the time of commute. Additionally, at block 506, the method 500 may involve determining a particular location of the particular vehicle representing where the particular vehicle is or was located during the time of commute. Further, at block 508, the method 500 may involve using the particular location of the particular vehicle to geo-reference the radio data collected while the mobile device is located within the particular vehicle during the time of commute.

Although certain methods have been described, it should be understood that other processes and/or modification of one or more of the described processes may also be possible in the context of the present disclosure.

IV. Example Hardware and Software

The processes described herein may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 6:
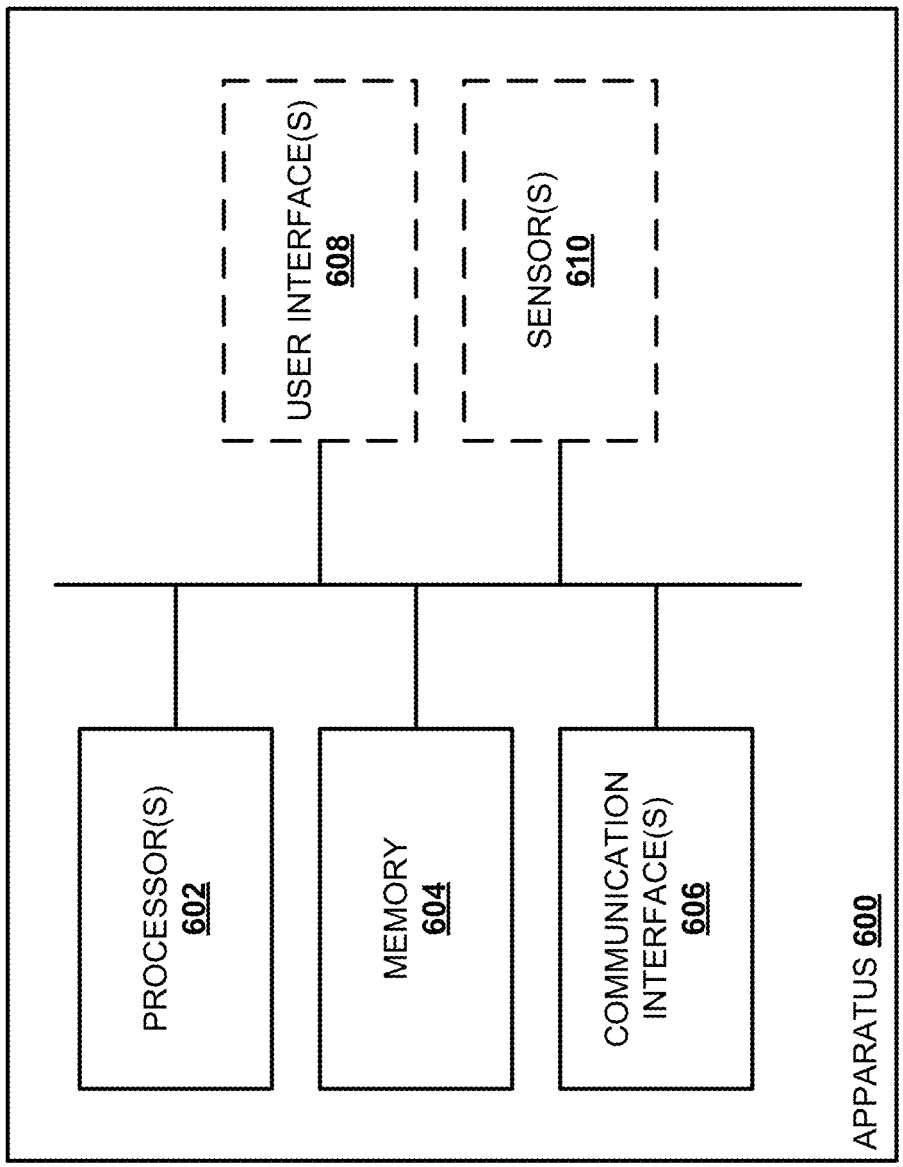
FIG. 6 illustrates an example apparatus, in accordance with an example implementation.

FIG. 6 is a schematic block diagram of an apparatus 600 that may be involved in a feedback loop for improving performance of a radio-based positioning system, according to an example embodiment. The apparatus 600 could, for instance, represent a server (e.g., server system 102) or a mobile device (e.g., one of the mobile devices 106), among other options. Moreover, the apparatus 600 could take the form of or otherwise be part of a system, such as any of those described herein.

As shown, apparatus 600 could include processor(s) 602, a memory 604 (e.g., database 108), communication interface(s) 606, an (optional) user interface(s) 608, and (optional) sensor(s) 610. Some or all of the components of the apparatus 600 may be connected via a bus (or other mechanism) and/or be combined into one or more modules.

Processor(s) 602 could have numerous functions, such as controlling the memory 604, communication interface(s) 606, the user interface(s) 608, and/or the sensor(s) 610 in any feasible manner currently known or developed in the future. For example, the memory 604 could include or otherwise contain computer program code (program instructions), and the processor(s) 602 may be configured to execute the program code to cause the apparatus 600 to perform and/or control operations, such as any of those described herein and/or other operations. Thus, apparatus 600 and/or processor(s) 602 could be referred to as carrying out such operations.

Moreover, processor(s) 602 (and also any other processor(s) mentioned herein) may be processor(s) of any suitable type. For example (and without limitation), processor(s) 602 may include: one or more microprocessor(s), one or more processor(s) with accompanying one or more digital signal processor(s), one or more processor(s) without accompanying digital signal processor(s), one or more special-purpose computer chips, one or more FPGA(s), one or more controller(s), one or more ASIC(s), one or more computer(s), any structure/hardware that has been programmed in such a way to perform described operation(s), and/or an application processor that runs an operating system, among other possibilities.

Furthermore, memory 604 could also take various form without departing from the scope of the present disclosure. In particular, memory 604 could be separate from processor(s) 602. Additionally or alternatively, memory 604 may be part of or otherwise integrated with one or more of the processor(s) 602. In this case, memory 604 may be fixed to the from processor(s) 602 or may be at least partially removable from the processor(s) 602. In any case, the memory 604 be or take the form of volatile and/or non-volatile memory, and could include program memory, working memory, and/or data memory, among others.

By way of example (and without limitation), memory 604 could be or otherwise include: FLASH memory (or a part thereof), any of a Read-Only Memory (ROM), PROM, EPROM and EEPROM memory (or a part thereof), a hard disc (or a part thereof), a Random Access Memory (RAM), and/or Dynamic RAM (DRAM), among others. In some cases, memory 604 may additionally or alternatively include an operating system for processor(s) 602 and/or firmware for apparatus 600. Further, memory 604 could additionally or alternatively be used by processor(s) 602 when executing an operating system and/or computer program. Moreover, memory 604 could additionally or alternatively store data, such as any types, sets, instances, and/or samples of data described herein. Other examples are also possible.

Further, communication interface(s) 606 could enable the apparatus 600 to communicate with other entities. The communication interface(s) 606 may, for instance, include a wireless interface (e.g. a cellular radio communication interface and/or a WLAN interface) and/or wire-bound interface (e.g. an IP-based interface, for instance to communicate with entities via the Internet). Moreover, the communication interface(s) 606 may take the form of or provide for wireless and/or wired communication with transmitting and/or receiving device(s), such as one or more antenna(s) and/or radio receiver(s) of the apparatus 600.

Yet further, user interface(s) 608 could be any device(s) for presenting and/or receiving information. For instance, user interface(s) 608 include display device(s), audio device(s) or the like for visually and/or audibly providing information (e.g., to a user). Additionally or alternatively, user interface(s) 608 could include input device(s) (e.g. a keyboard, keypad, touchpad, mouse, etc.) for receiving information (e.g., based on input provided by a user).

Finally, sensor(s) 610 could include any type(s) of sensor(s) currently known and/or developed in the future.

For example, sensor(s) 610 could include a barometric sensor (e.g., to gather pressure information), motion sensor(s) (e.g., inertial measurement unit (IMU)), image capture device(s), position sensor(s), Global Navigation Satellite System (GNSS) receiver(s) (e.g., in the form of a Global Positioning System (GPS) receiver), and/or any (currently known and/or future-developed) sensor(s) that enable the apparatus 600 to perform radio measurements (e.g., Bluetooth and/or Wi-Fi receiver(s)), among other possibilities.

In a further aspect, the term "computer-readable medium" as used herein may refer to any medium that participates in providing information to processor(s), including instructions for execution. Such a medium may take many forms, including, but not limited to computer-readable storage medium (e.g., non-volatile media, volatile media), and/or transmission media. Non-transitory media, such as non-volatile media, may include, for example, optical or magnetic disks, such as storage device. Volatile media may include, for example, a dynamic memory. Transmission media may include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media.

Generally speaking, common forms of computer-readable media may include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read.

In some cases, the term computer-readable storage medium may be used herein to refer to any computer-readable medium except transmission media. Further, logic encoded in one or more tangible media may includes processor instructions on a computer-readable storage media and/or special purpose hardware (e.g., ASIC).

In practice, a computer-readable storage medium could have stored thereon instructions executable by processor(s) to cause an apparatus to perform operations, such as any of those described herein. Accordingly, a computer program could be stored in a computer readable storage medium in the form of instructions encoding the computer readable storage medium. The computer-readable storage medium may be intended for taking part in the operation of a device, like an internal or external memory or hard disk of a computer, or be intended for distribution of the program, like an optical disc, among other options.

V. Example Geographic Database

Figure 7:
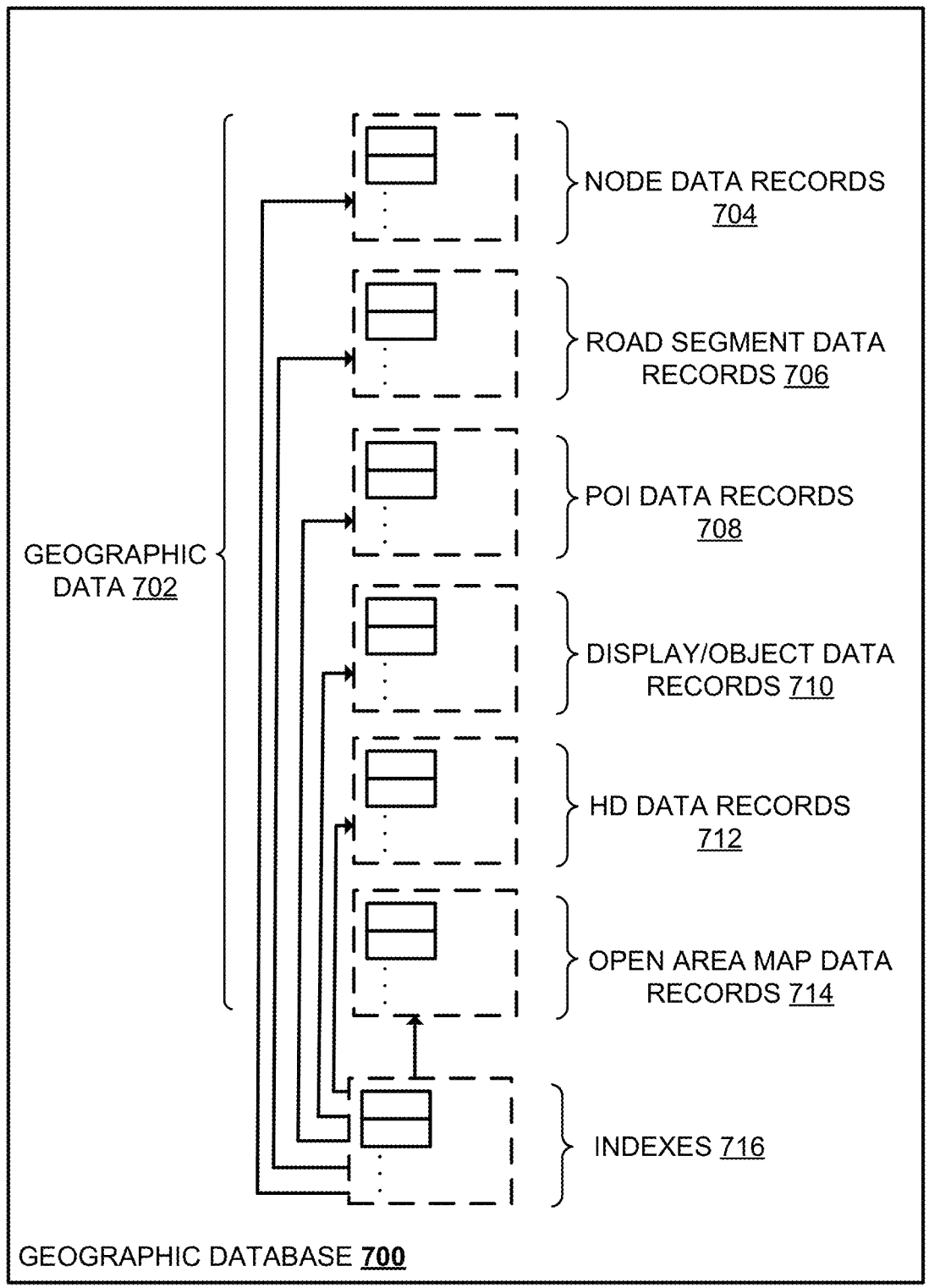
FIG. 7 illustrates a diagram of a geographic database, in accordance with an example implementation.

FIG. 7 illustrates a diagram of a geographic database 700, according to an example implementation. Geographic database 700 could be included within, integrated with, or be separate from another database, data storage device, memory, or the like described herein (e.g., memory 604). Additionally or alternatively, geographic database 700 could be stored on or otherwise made accessible to any entity described herein without departing from the scope of the present disclosure. Moreover, although certain aspects of the geographic database are described in the context of outdoor mapping and/or outdoor navigation-related services, it should be understand that some or all such aspects could extend to apply in the context of indoor mapping and/or indoor navigation-related services.

In this regard, the terms indoors, indoor area, indoor space, indoor environment, or the like used herein could refer any physical area/space that is at least partially enclosed, such as, e.g., for purpose of at least partially covering people and/or object(s) (e.g., a building, home, venue, tunnel, etc.) And the terms outdoors, outdoor area, outdoor space, outdoor environment, or the like used herein could refer to any physical areas/spaces other than those that are indoors (e.g., a park, street, intersection, sidewalk, beach, plaza, etc.) Of course, the terms indoors and outdoors or the like can be defined in other ways as well.

More specifically, the geographic database 700 may include geographic data 702 used for (or configured to be compiled to be used for) mapping and/or navigation-related services. For instance, the geographic database 700 may include high resolution or high definition (HD) mapping data that provide centimeter-level or better accuracy of map features. By way of example, the geographic database 700 can be based at least in part on Light Detection and Ranging (LiDAR) and/or other technology to collect billions of 3D points and model road surfaces (and/or other map features down), e.g., to the number lanes and their widths. In some cases, the HD mapping data (e.g., HD data records 712) may capture and store details such as the slope and curvature of the road, lane markings, roadside objects such as sign posts, including what the signage denotes, and/or shape/sizes of indoor objects, hallways, rooms etc. In practice, the HD mapping data may enable precise localization of an entity on a road and/or in a building, and/or may enable determination of map data updates (e.g., learned speed limit values) to at high accuracy levels, among other options.

In the geographic database 700, geographic features (e.g., two-dimensional or three-dimensional features) may be represented using polygons (e.g., two-dimensional features) or polygon extrusions (e.g., three-dimensional features). For example, the edges of the polygons correspond to the boundaries or edges of the respective geographic feature. In the case of a building, a two-dimensional polygon can be used to represent a footprint of the building, and a three-dimensional polygon extrusion can be used to represent the three-dimensional surfaces of the building. It is contemplated that although various embodiments are discussed with respect to two-dimensional polygons, it is contemplated that the embodiments are also applicable to three-dimensional polygon extrusions. Accordingly, the terms polygons and polygon extrusions as used herein can be used interchangeably.

In this regard, the following terminology may apply to the representation of geographic features in the geographic database 700.

"Node"—A point that terminates a link.

"Line segment"—A straight line connecting two points.

"Link" (or "edge")—A contiguous, non-branching string of one or more line segments terminating in a node at each end.

"Shape point"—A point along a link between two nodes (e.g., used to alter a shape of the link without defining new nodes).

"Oriented link"—A link that has a starting node (referred to as the "reference node") and an ending node (referred to as the "non reference node").

"Simple polygon"—An interior area of an outer boundary formed by a string of oriented links that begins and ends in one node. In one embodiment, a simple polygon does not cross itself.

"Polygon"—An area bounded by an outer boundary and none or at least one interior boundary (e.g., a hole or island). In one embodiment, a polygon is constructed from one outer simple polygon and none or at least one inner simple polygon. A polygon is simple if it just consists of one simple polygon, or complex if it has at least one inner simple polygon.

In an example implementation, the geographic database 700 may follow certain conventions. For example, links might not cross themselves and might not cross each other except at a node. Also, there may be no duplicated shape points, nodes, or links. Two links that connect each other may have a common node. In the geographic database 700, overlapping geographic features may be represented by overlapping polygons. When polygons overlap, the boundary of one polygon may cross the boundary of the other polygon. In the geographic database 700, the location at which the boundary of one polygon intersects the boundary of another polygon may be represented by a node. In an embodiment, a node may be used to represent other locations along the boundary of a polygon than a location at which the boundary of the polygon intersects the boundary of another polygon. Additionally or alternatively, a shape point may not be used to represent a point at which the boundary of a polygon intersects the boundary of another polygon.

In an example implementation, the geographic database 700 may be stored as a hierarchical or multi-level tile-based projection or structure. More specifically, in one embodiment, the geographic database 700 may be defined according to a normalized Mercator projection. Other projections may be used. By way of example, the map tile grid of a Mercator or similar projection may be a multilevel grid. Each cell or tile in a level of the map tile grid may be divisible into the same number of tiles of that same level of grid. In other words, the initial level of the map tile grid (e.g., a level at the lowest zoom level) may be divisible into four cells or rectangles. Each of those cells are in turn divisible into four cells, and so on until the highest zoom or resolution level of the projection is reached.

In some implementations, the map tile grid may be numbered in a systematic fashion to define a tile identifier (tile ID). For example, the top left tile may be numbered 00, the top right tile may be numbered 01, the bottom left tile may be numbered 10, and the bottom right tile may be numbered 11. Further, each cell may be divided into four rectangles and numbered by concatenating the parent tile ID and the new tile position. A variety of numbering schemes also is possible. Any number of levels with increasingly smaller geographic areas may represent the map tile grid. Any level (n) of the map tile grid may have 2(n+1) cells. Accordingly, any tile of the level (n) has a geographic area of A/2(n+1) where A is the total geographic area of the world or the total area of the map tile grid 10. Because of the numbering system, the exact position of any tile in any level of the map tile grid or projection may be uniquely determined from the tile ID.

In this regard, a system may identify a tile by a quadkey determined based on the tile ID of a tile of the map tile grid. The quadkey, for example, is a one-dimensional array including numerical values. In one embodiment, the quadkey may be calculated or determined by interleaving the bits of the row and column coordinates of a tile in the grid at a specific level. The interleaved bits may be converted to a predetermined base number (e.g., base 10, base 4, hexadecimal). In one example, leading zeroes are inserted or retained regardless of the level of the map tile grid in order to maintain a constant length for the one-dimensional array of the quadkey. In another example, the length of the one-dimensional array of the quadkey may indicate the corresponding level within the map tile grid 10. In an embodiment, the quadkey is an example of the hash or encoding scheme of the respective geographical coordinates of a geographical data point that can be used to identify a tile in which the geographical data point is located.

As shown, the geographic database 700 may include node data records 704, road segment or link data records 706, Points of Interest (POI) data records 708, display/object data records 710, HD mapping data records 712, open area map data records 714, and indexes 716, for example. More, fewer or different data records can be provided. For example, other data records can include cartographic data records, routing data, and/or maneuver data. Further, the indexes 716 may improve the speed of data retrieval operations in the geographic database 700. For instance, the indexes 716 may be used to quickly locate data without having to search every row in the geographic database 700 every time it is accessed. For example, in one embodiment, the indexes 716 can be a spatial index of the polygon points associated with stored feature polygons.

In exemplary embodiments, the road segment data records 706 may be links or segments representing roads, streets, or paths, as can be used in a calculated or recorded route information for determination of one or more personalized routes. The node data records 704 may be end points corresponding to the respective links or segments of the road segment data records 706. The road link data records 706 and the node data records 704 may represent a road network, such as used by vehicles, cars, and/or other entities. Alternatively, the geographic database 700 can contain path segment(s) and node data records or other data that represent pedestrian paths or areas in addition to or instead of the vehicle road record data (e.g., paths and/or areas for indoor and/or outdoor positioning and/or navigation), for example.

The road/link segments and nodes can be associated with attributes, such as geographic coordinates, street names, address ranges, speed limits, turn restrictions at intersections, and other navigation related attributes, room names/identifiers, vertical connector names/identifiers, as well as POIs, such as gasoline stations, hotels, restaurants, museums, stadiums, offices, automobile dealerships, auto repair shops, buildings, stores, parks, interior building features etc. The geographic database 700 can include data about the POIs and their respective locations in the POI data records 708. The geographic database 700 can also include data about places, such as cities, towns, or other communities, and other geographic features, such as bodies of water, mountain ranges, etc. Such place or feature data can be part of the POI data records 708 or can be associated with POIs or POI data records 708 (such as a data point used for displaying or representing a position of a city). Other examples are also possible.

In some implementations, the geographic database 700 can include display/object data records 710 for storing machine-readable visual representations and map data decoded from the visual representations and their respective properties. In addition, the display/object data records 710 can store post-processing rule sets for correcting and/or reducing the uncertainties in the display/object data decoded from clustered machine-readable visual representations. The display/object data records 700 can also store data selection rules (e.g., in a map data extension layer) for selecting from among multiple sets of readings of a machine-readable visual representation. The display/object data records 700 can also store confidence or accuracy determinations for the decoded map data. By way of example, the display/object data records 700 can be associated with one or more of the node records 704, road segment records 706, and/or POI data records 708 to support uses cases such as enhanced mapping user interfaces (UIs), autonomous driving, dynamic map updates, etc. In some cases, the display/object data records 710 may be stored as a data layer of the hierarchical tile-based structure of the geographic database 700 according to the various embodiments described herein.

In some implementations, as discussed above, the HD mapping data records 712 could model map features to centimeter-level or better accuracy. The HD mapping data records 911 may be divided into spatial partitions of varying sizes to provide HD mapping data to vehicles and/or other devices with near real-time speed without overloading the available resources of the vehicles and/or devices (e.g., computational, memory, bandwidth, etc. resources).

In an example implementation, the geographic database 700 can be maintained by a content provider in association with a services platform (e.g., a map developer). The map developer can collect geographic data to generate and/or enhance the geographic database 700. There can be different ways used by the map developer to collect data. These ways can include obtaining data from other sources, such as municipalities or respective geographic authorities. Additionally or alternatively, the map developer can employ field personnel to travel along roads and/or inside buildings (or other indoor areas) throughout the geographic region to observe features and/or record information about them, for example. Additionally or alternatively, remote sensing, such as aerial or satellite photography, can be used.

Generally, the geographic database 700 can be a master geographic database stored in a format that facilitates updating, maintenance, and/or development. For example, the master geographic database or data in the master geographic database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data can be compiled (such as into a platform specification format (PSF)) to organize and/or configure the data for performing navigation-related functions and/or services, such as route calculation, route guidance, map display, speed calculation, distance and travel time functions, and other functions, by a navigation or other device. The navigation-related functions can correspond to vehicle navigation, pedestrian navigation, or other types of navigation. The compilation to produce end user databases can be performed by a party or entity separate from the map developer. For instance, a customer of the map developer, such as a navigation device or other end user device developer, can perform compilation on a received geographic database in a delivery format to produce one or more compiled navigation databases.

In a further aspect, as noted, the geographic database 700 could additionally or alternatively include open area map data record(s) 714 for open area map(s). Generally speaking, open area map(s) may include image(s) or the like of respective layout(s) representing pedestrian walkable area(s) (e.g., indoor area(s), such as one or more floors of a building), and may be configured, separately or together, to enable or otherwise provide point-to-point routing within the layout(s). For example, in line with the discussion above, a radio map could include, be combined with, or otherwise correspond to an open area map representing features of an indoor and/or outdoor area at various locations in the area, to enable positioning and/or navigation solution(s) for the area. Other examples are also possible.

In an example implementation, an open area map may be positioned in, on, or over a geographic map or database (e.g., geographic database 700). The geographic map may be or include geographic data (e.g., any feasible data from records 704-712) corresponding to an area other than (or perhaps at least partially overlapping with) the area represented in the open area map. Also, the geographic map may represent compiled data that corresponds to a database or map configured for vehicle and/or pedestrian navigation. Alternatively, the geographic map may correspond to any real-world or geographic map or data that may or may not be used for navigation or routing. In any case, the geographic map may, e.g., include, but is not limited to, a road network. The road network may represent real-world roads or paths, such as in a city or other geographic region. Navigation attributes and POIs may also be provided.

In this regard, the open area map may be associated or linked with the geographic map or data. For example, one or more points or coordinates of the open area map may be aligned or positioned in or with one or more points or coordinates of the geographic map or data. In one embodiment, coordinates corresponding to tiles, objects, or other portion of the open area map may be in, translated to, or converted to real-world coordinates, such as longitude or latitude, Universal Transverse Mercator ("UTM") coordinates, or other rectangular or 3D coordinates, such as altitude or elevation points. Based on the real-world coordinates, the open area map or data thereof may be placed, positioned, or aligned with or within the geographic map.

For example, nodes, segments, or other features of the geographic map may correspond to real-world coordinates, such as longitude, latitude, and/or UTM coordinates as well as elevation or altitude information. Accordingly, by knowing the real-world coordinates of the open area map, the open area map may be accurately linked to a real-world position or location in the geographic map (e.g., geographic database 700 and/or a display). Additionally or alternatively, the coordinates or points of the open area map or data thereof may be linked or associated with a road network, such as road segments, nodes, and/or other features, without reference to real-world coordinates.

Given this, an end user may perform point-to-point routing using the open area map while viewing a surrounding geographic area or map. Also, the open area map may be linked to the geographic map for navigation or routing purposes, such as via point or navigation data.

For example, an end user may want to navigate or route from inside the open area map to a point external to the open area map that is covered in the geographic map, or vice versa (e.g., an indoor-to-outdoor transition and/or an outdoor-to-indoor transition). Accordingly, a route may be calculated and/or displayed in the open area map (e.g., in the context of indoor navigation), and then from a transition point or area, the route or second route (a continuing route to a selected destination outside of the open area map) may be calculated and/or displayed based on route calculation of the geographic map.

In this regard, in some cases, the navigation or routing of the geographic map may be different than the point-to-point routing of the open area map. For example, the routing of the geographic map may be based on vehicle and/or pedestrian navigation attributes of set roadways, and the routing of the open area map may be based on pedestrian navigation attributes of set indoor features (e.g., hallways, lobbies, rooms etc.) But in other cases, the navigation or routing of the geographic map could be the same as or similar to the point-to-point routing of the open area map.

In any case, in other implementations, an open area map may be positioned in or associated with the geographic map without being linked or tied in with navigation or routing features or functions of the geographic map. Namely, the routing or navigation of at least some open area map(s) may be independent or separate from routing or navigation of an associated geographic map. Other examples and aspects are also possible.

VI. Conclusion

Any connection described herein is to be understood in a way that the involved components are operationally coupled. Thus, the connection(s) can be direct or indirect with any number or combination of intervening elements, and there may be merely a functional relationship between the components.

Moreover, any of the methods, processes and actions described or illustrated herein may be implemented using executable instructions in a general-purpose or special-purpose processor(s) and stored on a computer-readable storage medium (e.g., disk, memory, or the like) to be executed by such processor(s).

The expression "A and/or B" is considered to comprise any one of the following three scenarios: (i) A, (ii) B, (iii) A and B. Furthermore, the article "a" is not to be understood as "one", i.e. use of the expression "an element" does not preclude that also further elements are present. The term "comprising" is to be understood in an open sense, i.e. in a way that an object that "comprises an element A" may also comprise further elements in addition to element A.

It will be understood that all presented embodiments are only exemplary, and that any feature presented for a particular example embodiment may be used with any aspect of the disclosure on its own or in combination with any feature presented for the same or another particular example embodiment and/or in combination with any other feature not mentioned. In particular, the example embodiments presented in this specification shall also be understood to be disclosed in all possible combinations with each other, as far as it is technically reasonable and the example embodiments are not alternatives with respect to each other. It will further be understood that any feature presented for an example embodiment in a particular category (method/apparatus/computer program/system) may also be used in a corresponding manner in an example embodiment of any other category. It should also be understood that presence of a feature in the presented example embodiments shall not necessarily mean that this feature forms an essential feature of the invention and cannot be omitted or substituted.

The statement of a feature comprises at least one of the subsequently enumerated features is not mandatory in the way that the feature comprises all subsequently enumerated features, or at least one feature of the plurality of the subsequently enumerated features. Also, a selection of the enumerated features in any combination or a selection of only one of the enumerated features is possible. The specific combination of all subsequently enumerated features may as well be considered. Also, a plurality of only one of the enumerated features may be possible.

The sequence of all method steps presented above is not mandatory, also alternative sequences may be possible. Nevertheless, the specific sequence of method steps exemplarily shown in the figures shall be considered as one possible sequence of method steps for the respective embodiment described by the respective figure.

The present disclosure has been described by means of example embodiments. It should be noted that there are alternative ways and variations which are obvious to a skilled person in the art and can be implemented without deviating from the scope of the present disclosure.

Many modifications and other embodiments of the present disclosure set forth herein will come to mind to one skilled in the art to which the present disclosure pertain having the benefit of the teachings presented in the foregoing descriptions and the associated drawings. Therefore, it is to be understood that the present disclosure is not to be limited to the specific embodiments disclosed and that modifications and other embodiments are intended to be included within the scope of the present disclosure. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the present disclosure. In this regard, for example, different combinations of elements and/or functions than those explicitly described above are also contemplated as may be set forth in some of the appended claims. Although specific terms are employed herein, they are used in a generic and descriptive sense only and not for purposes of limitation.

We claim:

1. A method comprising:
    obtaining, by one or more processors, radio data associated with a mobile device, wherein the radio data is collected while the mobile device is located within a particular vehicle during a time of commute;
    determining, by the one or more processors, a particular location of the particular vehicle representing where the particular vehicle is or was located during the time of commute;
    using, by the one or more processors, the particular location of the particular vehicle to geo-reference the radio data collected while the mobile device is located within the particular vehicle during the time of commute; and
    identifying, by the one or more processors, the particular vehicle in which the mobile device is or was located during the time of commute,
    wherein determining the particular location of the particular vehicle is based at least on the identifying of the particular vehicle in which the mobile device is or was located during the time of commute.

2. The method of claim 1,
    wherein identifying the particular vehicle is based on identification data associated with an application or database of a transport service, and wherein the identification data represents user-selection of the particular vehicle or of a route associated with the particular vehicle via the application of the transport service.

3. The method of claim 1, wherein identifying the particular vehicle comprises:
   determining one or more coarse locations of the mobile device during the time of commute;
   determining one or more respective locations of one or more vehicles during the time of commute, the one or more vehicles including the particular vehicle; and
   identifying the particular vehicle based at least on (i) the one or more respective locations of the particular vehicle during the time of commute substantially matching (ii) the one or more coarse locations of the mobile device during the time of commute.

4. An apparatus comprising:
   one or more processors;
   a non-transitory computer readable medium; and
   program instructions stored on the non-transitory computer readable medium and executable by the one or more processors to:
      obtain radio data associated with a mobile device, wherein the radio data is collected while the mobile device is located within a particular vehicle during a time of commute;
      determine a particular location of the particular vehicle representing where the particular vehicle is or was located during the time of commute;
      use the particular location of the particular vehicle to geo-reference the radio data collected while the mobile device is located within the particular vehicle during the time of commute; and
      identify the particular vehicle in which the mobile device is or was located during the time of commute, wherein determining the particular location of the particular vehicle is based at least on the identifying of the particular vehicle in which the mobile device is or was located during the time of commute,
   wherein identifying the particular vehicle is based on identification data associated with an application or database of a transport service, and
   wherein the identification data represents user-selection of the particular vehicle or of a route associated with the particular vehicle via the application of the transport service.

5. The apparatus of claim 4, wherein the program instructions are further executable to:
   identify the particular vehicle in which the mobile device is or was located during the time of commute, wherein determining the particular location of the particular vehicle is based at least on the identifying of the particular vehicle in which the mobile device is or was located during the time of commute,
   wherein identifying the particular vehicle comprises:
      determining one or more coarse locations of the mobile device during the time of commute;
      determining one or more respective locations of one or more vehicles during the time of commute, the one or more vehicles including the particular vehicle; and
      identifying the particular vehicle based at least on (i) the one or more respective locations of the particular vehicle during the time of commute substantially matching (ii) the one or more coarse locations of the mobile device during the time of commute.

* * * * *